United States Patent [19]
Kanjo et al.

[11] Patent Number: 5,558,411
[45] Date of Patent: Sep. 24, 1996

[54] RAILWAY BRAKING APPARATUS

[75] Inventors: Wajih Kanjo, Lockport, Ill.; Eric Smith, Burlington, Canada; Thomas J. Demoise, Export, Pa.; Michael Girotti, Thorold, Canada; Thomas McCabe, Monroeville; Charles B. Fessler, Lancaster, both of Pa.; Scott Natschke, Kankakee, Ill.

[73] Assignee: Westinghouse Air Brake Company, Wilmerding, Pa.

[21] Appl. No.: 475,853

[22] Filed: Jun. 7, 1995

Related U.S. Application Data

[62] Division of Ser. No. 278,937, Jul. 22, 1994.

[51] Int. Cl.$^6$ .................................................. B60T 13/22
[52] U.S. Cl. ........................... 303/71; 303/7; 303/15; 303/89; 303/74; 188/170; 188/265
[58] Field of Search .................... 303/2, 3, 7, 15–17, 303/20, 60, 68–71, 74, 75–78, 86, 89, 9.76; 188/170, 107, 106 F, 265, 353

[56] References Cited

U.S. PATENT DOCUMENTS

| | | | |
|---|---|---|---|
| 3,985,210 | 10/1976 | Hodge et al. | 188/170 |
| 4,564,245 | 1/1986 | Barberis | 303/71 X |
| 5,118,165 | 6/1992 | Latvala | 303/71 X |

Primary Examiner—Robert J. Oberleitner
Assistant Examiner—Peter M. Poon
Attorney, Agent, or Firm—James Ray & Associates

[57] ABSTRACT

Apparatus for indicating the condition of hand brakes on railway cars and for applying and releasing railway car parking or hand brakes automatically in response to predetermined conditions including movement of a train, wayside conditioning apparatus, wayside operating mechanism, a signal controlled by an operator and performance of predetermined railway operating procedures, such as completion of an air brake test procedure. The apparatus may respond to mechanical, electrical and electronic signals and may operate on pneumatic or electric power provided from the service air brake system of a train or from a source of power outside of such air brake system.

15 Claims, 15 Drawing Sheets

RAILWAY BRAKING APPARATUS

This application is a Divisional Application of application Ser. No. 08/278,937, filed Jul. 22, 1994 pending.

FIELD OF THE INVENTION

The present invention relates, in general, to braking apparatus for railway cars and, more specifically, this invention relates to apparatus for indicating the condition of hand brakes and for applying and releasing railway car parking or hand brakes, particularly including apparatus for performing such functions automatically in response to predetermined conditions.

BACKGROUND OF THE INVENTION

Usually when railway cars are taken cut of a train and parked at a siding or yard, the hand brakes on at least some of the cars are applied as a precaution against unwanted or unexpected movement of the cars. A typical hand brake may consist of an apparatus for manually applying a brake shoe or shoes to one or more wheels of a railway car by turning a handwheel or pumping a handle connected by gears and/or linkages to the brake shoe engaging mechanism and a mechanism for releasing the hand brake and causing the brake shoe or shoes to be disengaged from contact with the wheels.

A typical railway car hand brake can he released by turning the handwheel or pivoting a release lever. Pivoting the release lever will cause full release of the hand brake preferably without spinning the handwheel or moving the handle used to apply the brakes. This type of system is sometime referred to as a "quick release" hand brake. Prior to the present invention, the hand brakes were manually released separately on each car or on each end of a car equipped with hand brakes at each end and it is possible that the hand brakes may not all have been released when a train or group of cars are moved. When this occurs one or more of several serious problems can result. Among them are worn brake shoes, brake heads and wheel treads, cracked or broken wheels from overheating, worn rail heads, impaired truck action and damage to trucks. All of these conditions are detrimental and costly because they waste power and cause damage to trains and lading.

It is desirable to avoid these undesirable conditions and unnecessary expense by providing an apparatus to reduce or eliminate inadvertent unreleased hand brakes or parking brakes. The terms "parking brake" or "hand brakes" as used herein are intended to include not only the conventional hand brakes described above which are usually applied and released manually by a member of the train crew but also brakes which can be applied or released from a remote or central control point such as the locomotive or caboose and which may utilize vacuum, air pressure, electricity or other source of power to activate or release a brake on a standing railway car in a yard or siding. Such hand brakes or parking brakes may include portions of the service brake system. As used herein, the ten "service brakes" or "service air brakes" is intended to refer to air brakes usually on a train and controlled from a central location, usually the locomotive of a train, to retard the movement of a train or group of cars connected to a locomotive.

The objectives of this invention are to provide one or more of the following means of avoiding movement of a train with the hand brakes or parking brakes in an applied condition: signalling such condition, providing remote or central control apparatus for applying or releasing parking brakes on a train, and providing apparatus for automatically releasing parking brakes on a train in response to predetermined conditions with or without intervention of a member of a train crew.

Because of the strict operating and safety rules applicable to train operation in the United States and other countries the above objectives must be accomplished without interfering with proper train equipment and operation as required by practices established by the Association of American Railroads and by cognizant government agencies. These practices usually require performance of an air brake test procedure before a train is moved cut of a yard or terminal.

SUMMARY OF THE INVENTION

In a first aspect of the invention there is disclosed an apparatus for effecting a change in the condition of a hand brake system on a railway car equipped with a hand brake system and a service brake system in response to at least one of a predetermined group of response triggering conditions including movement of such railway car, speed of such movement, the application of service air brakes, the release of service air brakes, the applied condition of such hand brake, the released condition of such hand brake, the level of air pressure in such air brake system and a signal from a device controlled by a human operator, such apparatus including a first device for detecting at least one of such response triggering conditions and a second device, operatively associated with the first device, for producing a predetermined signal indicating that such condition has been detected.

In a second aspect of the invention there is disclosed a railway brake system for a railway train comprising a locomotive and at least one car equipped with brakes, the brake system comprising a first apparatus for applying such brakes to inhibit movement of the railway train, a second apparatus operable under certain predetermined conditions to cause the first apparatus to apply such brakes, a third apparatus normally in a first condition but responsive to the application of such brakes by operation of the second apparatus to assume a second condition and a fourth apparatus effective when the third apparatus is in its second condition to provide an indication thereof.

In a further aspect of the invention there is disclosed a railway parking brake system comprising a first device for applying a parking brake, a second device for releasing such parking brake, a third device for selectively conditioning said second device to an operative or an inoperative condition and a fourth device for applying a parking brake releasing force to the second device.

In another aspect of the invention there is disclosed a railway parking brake release system for a railway train consisting of at least one car equipped with fluid pressure operated service brakes and an auxiliary parking brake apparatus and having mechanisms for actuating such auxiliary parking brake apparatus to a braking condition and for releasing such auxiliary parking brake and apparatus the release system comprising an inlet connectable to the fluid pressure for such service brakes, a fluid pressure responsive first device in communication with such inlet and responsive to predetermined levels of fluid pressure therein to be conditioned to an operative or an inoperative condition and a parking brake release second device controlled by the first device and operable from a first position when the first device is in an inoperative condition in which such auxiliary parking brake apparatus may be actuated to a braking position and operable to a second position when the first device is in an operative condition in which the auxiliary parking brake apparatus will be released upon operation of the second device.

In a fifth aspect of the invention there is provided a brake system for a railway train consisting of at least one car equipped with fluid pressure operated service brakes, the brake system comprising an auxiliary parking brake apparatus operable by fluid pressure, a source of fluid pressure for the auxiliary parking brake apparatus, a first mechanism for connecting the source of fluid pressure for the auxiliary parking brake apparatus to the auxiliary parking brake apparatus, a second mechanism for operating the auxiliary parking brake to a braking position, a third mechanism responsive to a predetermined level of fluid pressure for releasing the auxiliary parking brake and a parking brake release control for controlling the application of fluid pressure to the third mechanism to thereby control the release of the auxiliary parking brake apparatus.

A sixth aspect of the invention provides a railway hand brake release system for a manually applied hand brake equipped with a quick release mechanism, the release system comprising an electrically operated solenoid valve, a first device for controlling the supply of electric power to the solenoid valve, a fluid pressure responsive device for actuating the quick release mechanism to release the hand brake and a control arrangement including the solenoid valve for controlling the application of fluid pressure to the fluid pressure responsive device to cause the release of the hand brake.

OBJECTS OF THE INVENTION

Therefore, it is a primary object of this invention to provide an apparatus for indicating a "hand brake applied" condition on a railway car and for releasing an applied hand brake which apparatus will function reliably without deviating from or requiring changes to current railway operating procedures.

Another object of this invention is to provide such apparatus which will operate automatically in response to performance of an air brake test prior to in-train operation of a railway car.

It is another object of this invention to provide such apparatus which will not interfere with manual application and release of hand brakes.

Still another object of this invention is to provide such apparatus which is power operated.

It is also an object of this invention to provide hand brake release apparatus which is operated by air pressure in e air brake system of the train.

Another object of this invention is to provide a hand brake release system which utilizes an air pressure distribution system separate from the air pressure distribution system for the service air brakes.

A further object of this invention is to provide hand brake release apparatus which is controlled by electrically or electronically operated equipment.

Yet another object of this invention is to provide a hand brake release mechanism operated by a source of power independent from the air pressure in the air brake system.

A still further object of this invention is to provide a hand brake release system operated by a source of electric power.

These and various other objects and advantages of the present invention will become apparent to persons skilled in the railway braking art from the following mere detailed description of the invention, particularly when such description is taken in conjunction with the attached drawings and the appended claims.

DESCRIPTION OF THE INVENTION

Figure 1:
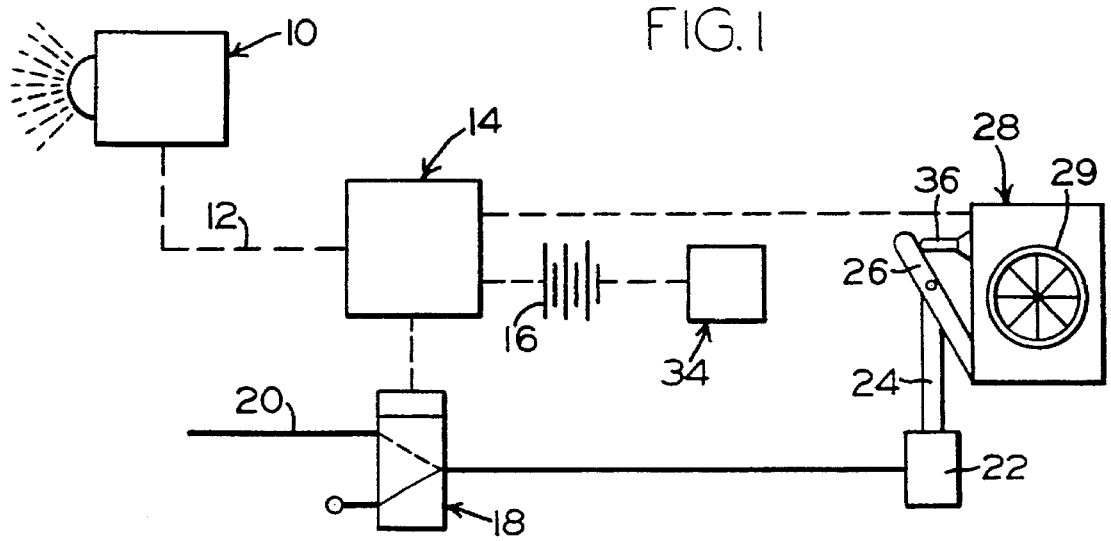
FIG. 1 is a schematic illustration of one form of the invention which utilizes a motion sensor.

Prior to proceeding to a more detailed description of the present invention, it should be noted that for the sake of clarity, identical components having identical functions have been designated by identical reference numerals throughout the drawings.

In conjunction with the description of some of the hand brake control mechanisms of this invention it would be helpful to understand certain railroad operating procedures relating to air brakes and hand brakes. One of these procedures previously referred to herein is the air brake test procedure which must be performed before a freight train which has been made up or whose consist has been changed can be moved out of a yard or terminal. A typical air brake test procedure may require performance of the ten steps hereinafter described after the cars have been connected to a locomotive or set of locomotives.

(1) Band brakes or parking brakes are engaged.
(2) Air brake hoses for the service air brakes are connected.
(3) The air brake system including pipes and reservoirs is charged to a predetermined pressure level.
(4) Air pressure leakage is checked to ensure that it does not exceed a predetermined maximum level, e.g. five pounds per square inch per minute in the air brake pipe.
(5) Air brakes are applied to a "normal" level by operating the main control valve in the locomotive to reduce air pressure in the air brake pipe by a predetermined level, e.g. 10 pounds per square inch. This causes the application of the air brakes on each car by the air pressure in the reservoirs on each car which will supply air to the brake cylinders under control of the railway car air brake control valve. A typical air brake system may include an auxiliary and emergency reservoirs.
(6) A brakeman walks along the train and checks that the service brakes on all cars have operated and brake shoes have been engaged.
(7) A full application of service air brakes is made by further reducing pressure in the air brake pipe to a predetermined level, e.g. 20–25 pounds per square inch.
(8) Service air brakes are released by manipulating the control valve in the locomotive.
(9) The air brake system is again charged to proper level.
(10) Hand brakes or parking brakes are released.

Referring now to FIG. 1, there is shown a block diagram of one presently preferred form of the invention in which an electronic or electrical signal generated by a motion sensor 10 is used to control operation of a hand brake or parking brake. The motion sensor 10 can be an infrared or other light sensitive motion sensor, certain types of which are known to those skilled in the art. The motion sensor 10 can be mounted on a railway car, not shown, to sense relative motion between the car and the ground, rail or ties. When the relative motion between the car and the reference exceeds a predetermined speed, an electrical signal will be transmitted over an electrical conductor 12 to a control box 14. The train speed at which this occurs should be sufficiently high to avoid generating a signal when a car is bumped or otherwise inadvertently moved but not so high as to allow appreciable dragging of a car with locked brakes. A preferred embodiment of the invention would cause a signal to be transmitted to the control box 14 at car speeds of about 10 miles per hour or higher. The motion sensor 10 may be adjustable to allow selection of a speed range to suit conditions or the desires of a particular train operator. Signal input to the control box 14 from the motion sensor 10 may be used directly or after amplification or to operate a relay, not shown, ultimately to control the application of power from a battery 16 or other source of electrical power to a magnet valve 18 which is actuated to allow air in service brake air pipe 20 to be applied to hand brake release cylinder 22. This causes piston rod 24 to move in a predetermined direction to move hand brake release lever 26 to a brake releasing position. Band brake release lever 26 is part of a hand brake or parking brake actuator mechanism 28 which has a handwheel 29. Preferably, parking brake actuator mechanism 28 is of the quick release type.

Figure 2:
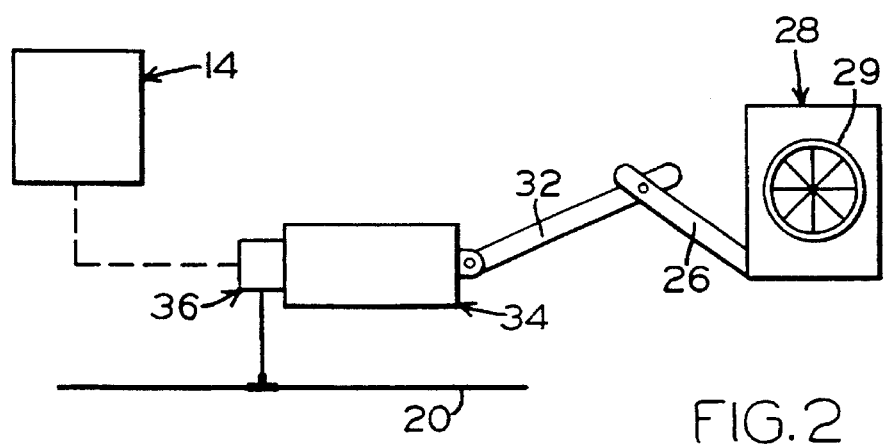
FIG. 2 is a partial schematic in illustration of the form of the invention shown in FIG. 1 but modified by the use of an electrically powered release actuator.

Alternatively, as seen in FIG. 2, a solenoid 30 may be substituted for the magnet valve 18. In such case the link or piston rod 32 of the solenoid 30 can be directly connected to brake release lever 26 and will effect release of the hand brake.

A solar charger 34 (FIG. 1) of any commercially available type and compatible with the battery 16 may be included in the system to keep battery 16 sufficiently charged to operate as described above. This is particularly important when the brake release lever 26 is operated directly by a solenoid 30 powered by the battery 16 as shown in FIG. 2.

To prevent continual operation of the release system while a train is moving, a switch 36 may be provided on the hand brake actuator 28. Switch 36 will be open and prevent the flow of current from battery 16 to magnet valve 18 or solenoid 30 unless the hand brake or parking brake is on. It will be possible for those skilled in the art to devise various alternative physical arrangements of switch 36, the circuitry of control box 14 and the mechanism of hand brake actuator 28 to accomplish the desired result of making the system operative only when the hand brake or parking brake is applied, the car is moving and the air brake brake pipe is in a charged condition.

As will be understood by those skilled in the art, the brake release system described above can be installed on a railway car without affecting the air brake system or the service or parking brakes on any other car and will operate effectively on any car in a train on which it is installed irrespective of whether or not an identical release system or any other hand brake release system is installed on any other car in the train. Thus it may be retrofitted on a single car or any given portion of the cars in a train at the option-of the car owner. No modification is required to the air brake system controls on the locomotive nor is normal manual hand brake application and release affected in any way.

Figure 3:
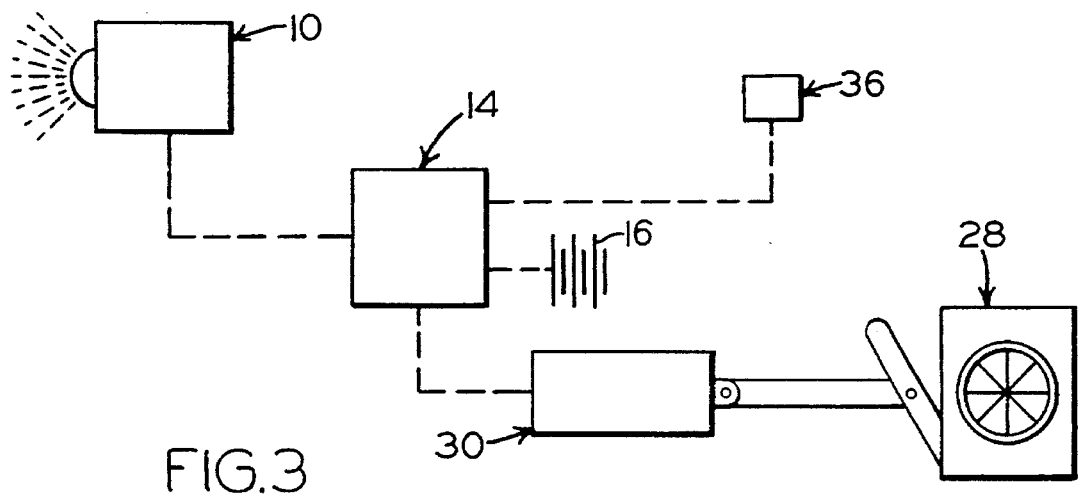
FIG. 3 is a schematic illustration of an alternative form of the invention which includes a transducer pressure switch.

It is desirable, as previously stated, that operation of the hand brake release system be limited to those times when the air brake air pipe is fully charged, indicating a normal air brake system condition without the air brakes being applied. FIGS. 2 and 3 show such a system in which a transducer or pressure switch 36 is provided and is introduced into the circuitry of the control box 14 in a manner readily understood by those skilled in the art which will not permit operation of the hand brake release system unless the air brake pipe is charged to a predetermined level in accordance with railway operating and safety rules.

Figure 4:
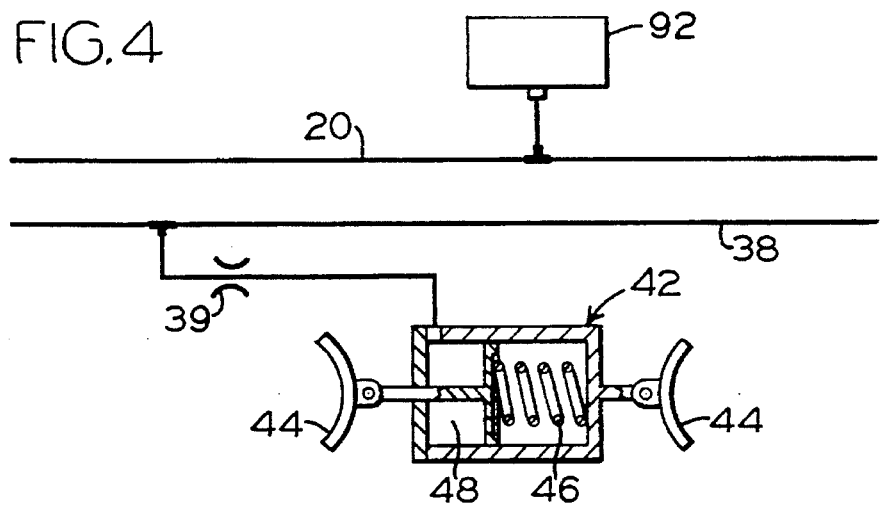
FIG. 4 is a schematic illustration of another alternative form of the invention in which the parking brake system is separate from the service brake system.

The hand brake release system shown in FIG. 4 a hand brake or parking brake application and release system which is separate from the service brake system making it possible to eliminate the presently used type of hand brake actuator employing handles, wheels or levers, chains, chain drums and release mechanisms. Instead the system consists of a hand brake air pipe 38 separate from service air brake air pipe 20, a parking brake cylinder 42, a spring operated set of brake shoes 44 and a brake pressure spring 46.

It should be understood that the brake shoes and rigging can be the same ones used as the service brake and that in such event it is only necessary to add a parking brake cylinder 42 as an auxiliary means of engaging the brake shoes 44. It should further be understood that the brake shoe arrangement shown is for purposes of illustration only and that various brake arrangements may be utilized, including but not limited to clasp brakes and disc brakes as would be recognized by those skilled in the art.

This form of parking brake is particularly suited for use on cars mounted on trucks having at least two axles so that a single parking brake cylinder 42 can be used to control a pair of opposed brake shoes 44 which engage one wheel on each of the two axles. Of course, more than one parking brake cylinder 42 and more than a pair of brake shoes 44 may he employed.

Operation of the system shown in FIG. 4 is described below.

With the hand brake air pipe 38 in charged condition compressed air enters chamber 48 of parking brake cylinder 42, compressing brake spring 46 and holding brake shoes 44 in released position out of contact with the wheels of a railway car truck, not shown. To apply the parking brakes, the engineer exhausts air in the hand brake air pipe 38, causing the pressure to drop in the chamber 48 and the brake shoes 44 to be pushed into braking position by brake spring 46. This condition will be maintained until the engineer determines that the parking brake should be released which he accomplishes by directing air from a source of compressed air, which may be the locomotive air brake compressor, not shown, into the hand brake air pipe 38 and via the air pipe 38 into each parking brake cylinder 42, releasing all of the parking brakes 44 in the system.

This puts complete control of both the application and release of hand brakes in the engineer, reducing the likelihood of improper or spurious hand brake operation. It can be seen that in the event of accidental or other unforeseen separation of a train into two or more parts, often referred to as a "break-in-two", a condition which will usually cause an emergency application of the train's service air brakes, the parking brake air pipe 38 would probably also be severed and the parking brakes 44 will be applied under conditions not being controlled by the engineer. This might result in a sudden severe application of braking force to the separated portions of the train which could in turn cause damage to the train or its lading. If desired, a choke valve or other control 39 can be interposed in the pipe line between the hand brake air pipe 38 and the parking brake cylinder 42 which would be effective under conditions of sudden drop in pressure in air pipe 38 to restrict or choke the flow of air cut of chamber 48. This would ensure that in the special situations described above the parking brake would be applied only after train speed is substantially reduced, thereby avoiding the harmful results of a sudden severe application of both service brakes and parking brakes simultaneously.

Figure 5:
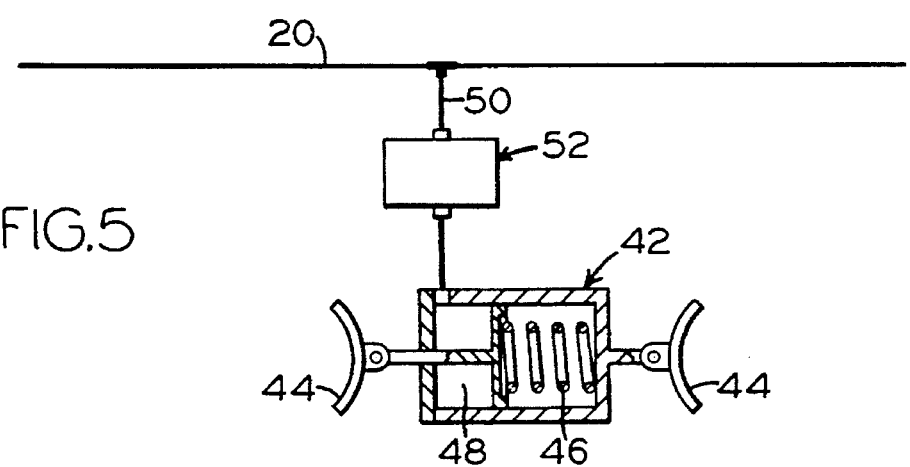
FIG. 5 shows a system similar to that depicted in FIG. 4 but which does not require a separate air distribution system for the parking brakes.

There is shown in FIG. 5 a modification of the system described in connection with FIG. 4 but which does not require a separate parking brake air pipe. Instead brake pipe 20 is connected by pipe 50 through a timing valve 52 to parking brake cylinder 42. Timing valve 52 may preferably be constructed to allow unrestricted flow of air to the parking brake cylinder 42 but to limit air flow out of it. It will be seen by those skilled in the art that after brake pipe 20 is charged with compressed air, spring 46 will be compressed by air pressure admitted by timing valve 52 which allows the full flow of pressurized air into chamber 48. The escape of air from chamber 48 is however controlled by timing valve 52 so that the application of the parking brake is delayed from the time that a reduction in brake pipe pressure occurs. If desired, the length of the delay produced by thing valve 52 can be adjustable. The flow of pressurized air into the parking brake cylinder 42 can also be delayed and the delay in transmitting a reduction in brake pipe pressure through timing valve 52 can be different from the delay required to transmit an increase in such pressure by apparatus known to those skilled in the art.

The delay in releasing the parking brake, if employed, can be made to ensure that such release does not occur while the service brakes are engaged and the delay in applying the parking brake helps avoid the detrimental braking conditions which may occur upon simultaneous sudden application of both service and parking brakes during an emergency situation such as break-in-two.

Figure 6:
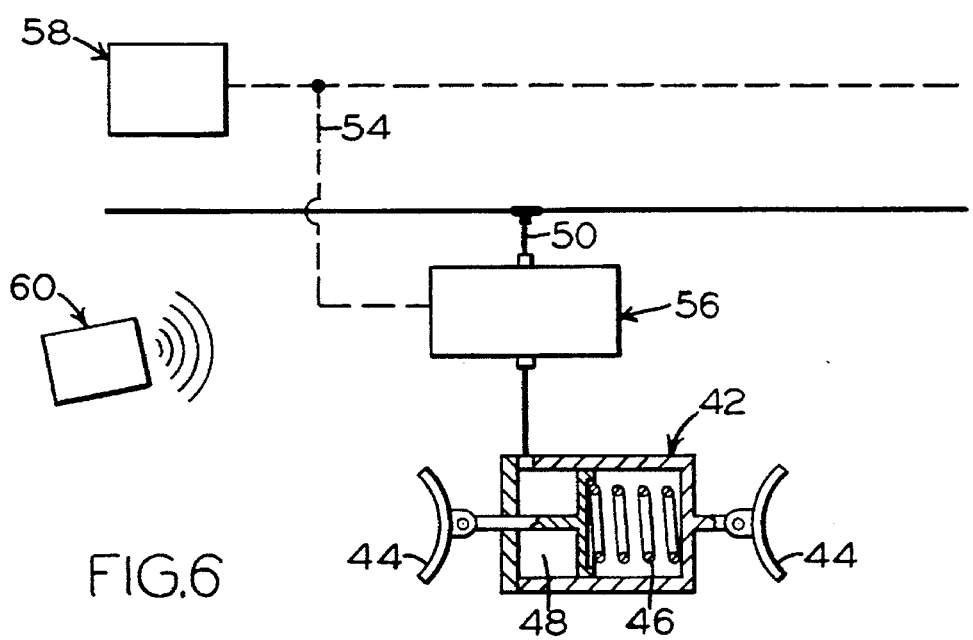
FIG. 6 shows the system of FIG. 5 modified to utilize electrically operated elements.

There is shown in FIG. 6 a modified version of the system shown in FIG. 5. In the modified-version the timing valve 52 is replaced by an electrically or electronically operated valve 56. The valve 56 may be connected by an electrical conductor 54 to a switch or other control 58 operated by the engineer which control 58 controls the application of power to the operating means for valve 56. Instead of an electrical conductor 54 the valve 56 may include a radio or infrared receiver and associated devices so that the valve 56 may be operated by a radio control or infrared transmitter 60 in a manner known to those skilled in the art. The radio control 60 can be located in the locomotive and be operated by the engineer or may be of the portable type carried by a brakeman or other train operating personnel. The radio control version has the advantage over the hard wire type that it can be applied to individual cars without requiring modification of the entire train or of the service air brake system.

Figure 7:
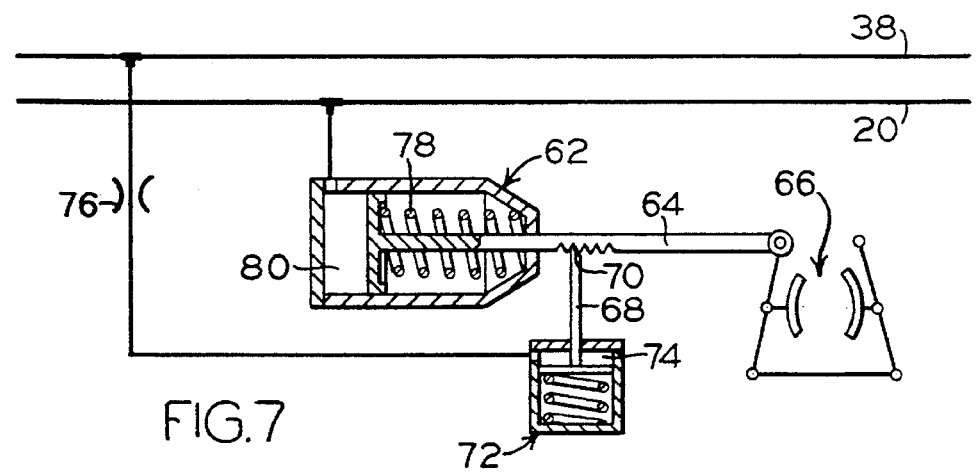
FIG. 7 shows another form of the invention which can be readily retrofitted to existing railway stock.

FIG. 7 shows another type of hand brake mechanism and release which utilizes the brake cylinder 62 already on a railway car. In this version of the invention the brake cylinder 62 is modified by replacing the standard piston rod with a form of piston rod 64 which can be latched into a locked position with the brakes 66 in applied condition. In this case the parking brake is applied by normal operation of the service air brake cylinder 62 and held in applied condition by a latching detent 70 controlled by piston rod 68 of the latching cylinder 72. Air pressure in a separate hand brake air pipe 38 controls the operation of latching cylinder 72. Air pressure in the hand brake air pipe 38 is applied to the release chamber or upper end 74 of latching cylinder 72 as viewed in FIG. 7 to withdraw latching detent 70 from the piston rod 64 so that the brakes 66 can be released when pressure in the chamber 78 of the brake cylinder 62 exceeds the pressure in the chamber 80 thereof. A throttling valve 76 is interposed between the hand brake air pipe 3S and the latching cylinder 72 to delay the release of hand brakes. In this version of the invention, release of the hand brakes will take place throughout the train and is under the direct control of the engineer.

Figure 8:
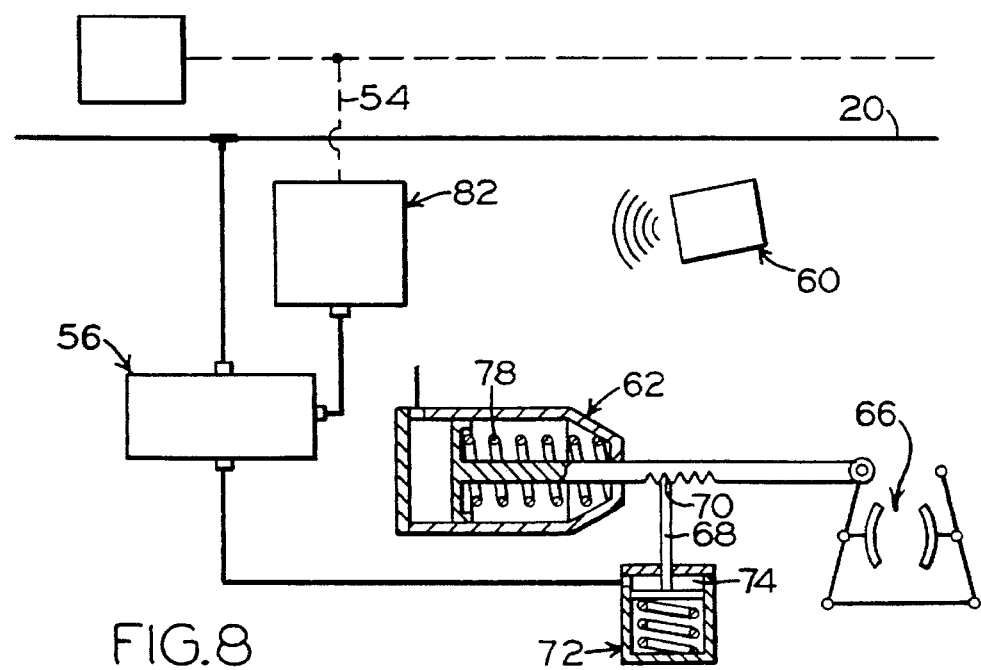
FIG. 8 shows a system similar to that shown in FIG. 7, modified to utilize electrically operated elements.

FIG. 8 shows a system similar to the system shown in FIG. 7 except that it avoids the necessity of a separate hand brake air pipe and substitutes electrically or electronically operated controls 82 for controlling the application of air pressure from the service brake air pipe 20 to operate the latching cylinder 72 to withdraw detent 70 and permit the hand brakes to be released. The controls 82 are connected by an electrical conductor 54 to a switch or other control 58 operated by the engineer. Instead of an electrical conductor 54 the controls 82 may include a receiver and associated devices for operation by a signal from a radio or infrared control 60. The radio control 60 can be located in the locomotive and be operated by the engineer or may be of the portable type carried and operated by a brakeman or other train operating personnel. The radio control has the advantage that it can be applied to individual cars without requiring modification of the entire train or of the service air brake system. As will be understood by those skilled in the art, the valve 56 may be operated directly by the switch 58 or by transmissions from control 60 and the separate control module 82 dispensed with.

Figure 9:
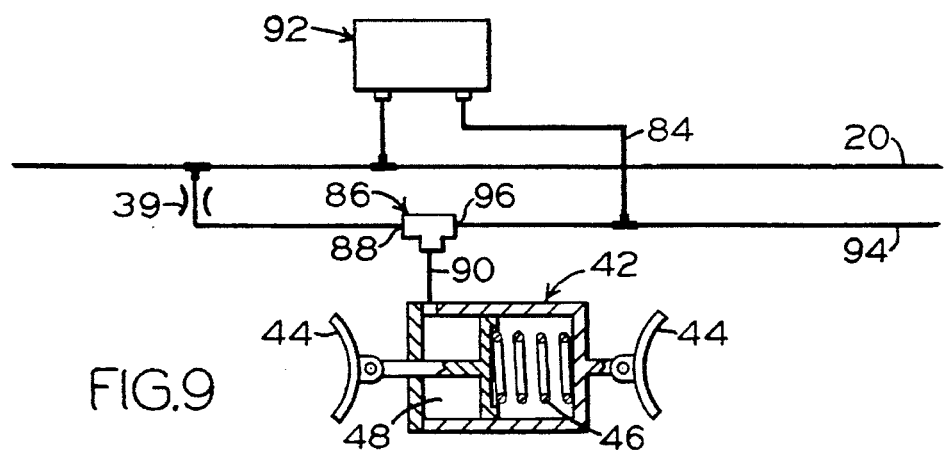
FIG. 9 shows a modified version of the form of the invention depicted in FIG. 4.

FIG. 9 shows a hand brake system particularly adapted for use on railway cars having truck mounted brakes similar to the system previously described in connection with FIG. 4. The identical numerals are applied to identical components in FIGS. 4 and 9. The system shown in FIG. 9, however, eliminates the necessity for a separate hand brake air pipe. Air pressure to compress spring 46 in the parking brake cylinder 42 to effect the release of the hand brakes is supplied from the service brake air pipe 20 through a choke or metering valve 39 and a double check valve 86. As can be seen, when the service brake air pipe 20 is charged, air pressure is metered through valve 39 and one side 88 of double check valve 86 and through pipe 90 to the parking brake release chamber 48. This compresses spring 46, which normally expands the parking brakes 44 into a braking position, releasing the parking brake 44. The passage of air from service brake air pipe 20 to the brake cylinder 42 is controlled by brake cylinder control valve 92 which controls air pressure in pipe 84 and pipe 94 to the service brake cylinder. When air pressure in pipe 94 is higher than the brake pressure in pipe 90, which occurs in the event of a severe service brake application, air pressure from pipe 94 will pass through the other end 96 of double check valve 86 into the chamber 48 of parking brake cylinder 42 preventing the application of parking brakes 44 until the pressure in the brake cylinder pipe 94 is substantially reduced. This prevents a break-in-two or other severe brake application from causing both the parking brakes and the service brakes to be applied simultaneously.

Figure 10:
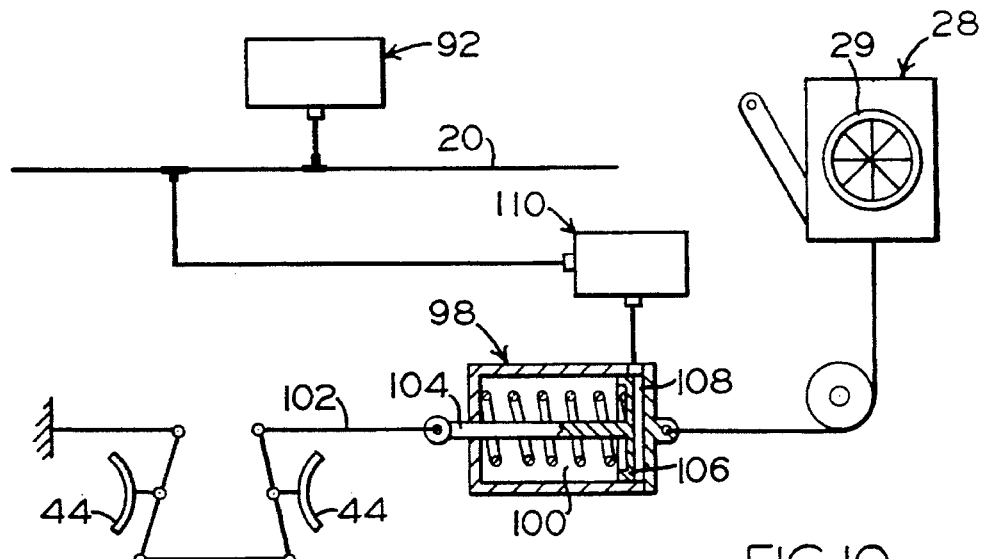
FIG. 10 shows a form of the invention particularly useful with truck mounted brakes and retaining a conventional hand brake actuator.

FIG. 10 shows a form of the invention in which a conventional hand brake actuator 28 is used in connection with an automatic hand brake release system which includes a release actuator 98 which is biased into the brake applying condition by a compression spring 100. The system further includes a linkage 102 connected to the piston rod 104 of piston 106 in the release actuator. With the hand brakes released the system will be in the condition shown in FIG. 10. The hand brakes are manually applied by turning the handwheel 29 of hand brake actuator 28 moving the release actuator 98 to the right as viewed in FIG. 10. Spring 100 will maintain piston 106 and piston rod 104 in the position shown effecting brake application through linkage 102. When the service brake air pipe 20 is charged, air pressure passes from pipe 20 through timing valve 110 into the chamber 108 of release actuator 98 causing piston 106 to move to the left as shown in the drawing, compressing spring 100 and causing linkage 102 to move in a manner which will effect the release of the brakes 44. Preferably timing valve 110 will not delay the supply of pressurized air to release the hand brakes. The hand brake actuator 28 will remain in a condition in which hand brakes will be applied when the piston 106 of release actuator 98 is allowed to return to the position shown in FIG. 10. When service brakes are applied there will be a drop in pressure in pipe 20 but valve 110 will delay the escape of air from chamber 108 and the hand brake will not be reapplied until train speed is substantially reduced. The hand brakes can be manually released at any time through hand brake actuator 28.

Figure 11:
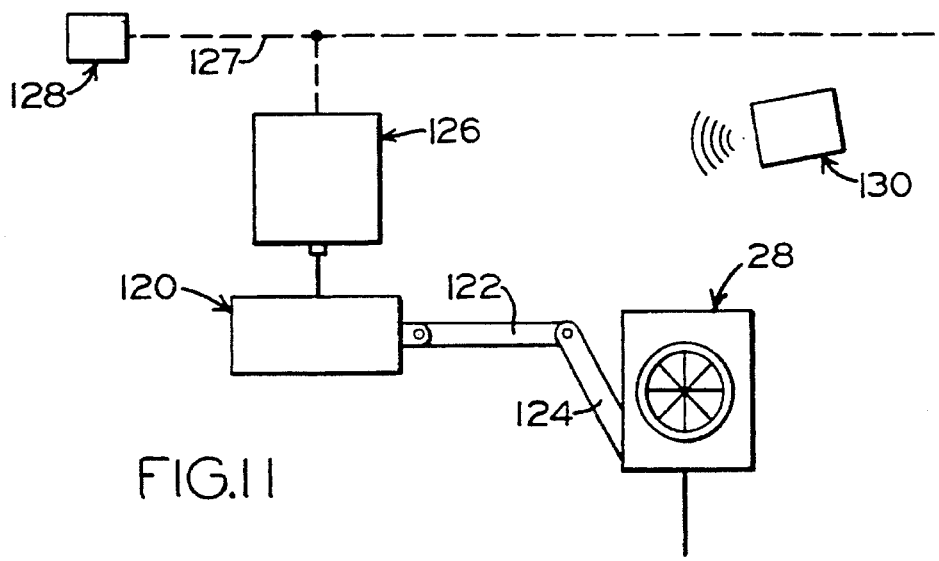
FIG. 11 shows another form of the invention in which operation of the release lever of a hand brake actuator is electrically controlled.
Figure 12:
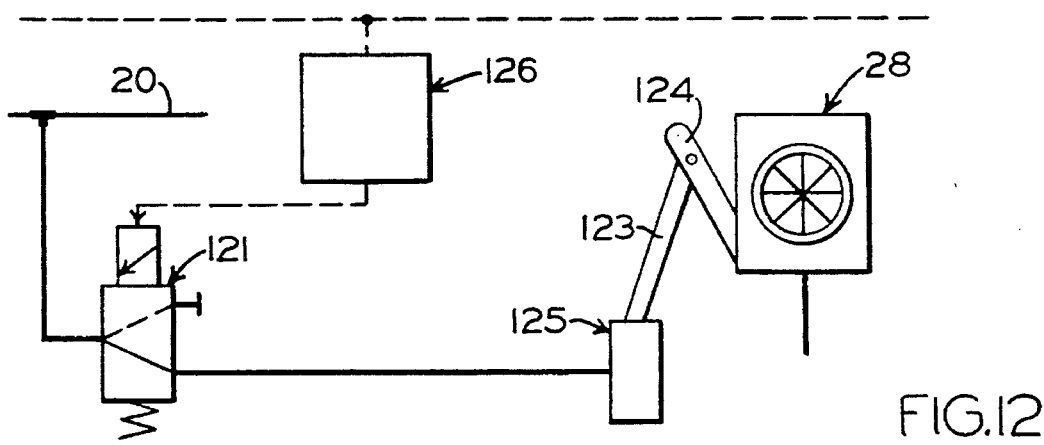
FIG. 12 shows a form of the invention employing an air operated release cylinder for a hand brake actuator.

FIG. 11 shows a system which also utilizes a conventional hand brake actuator 28 of the quick release type which is operated by a solenoid 120 which has a link or rod 122 connected to hand brake release lever 124. Solenoid 120 is controlled by an electrical or electronic control system 126 which in turn is controlled by an external signal applied in one of the manners described below. The electrical control 126 may be operated by current sent along electrical conductor 127 through a switch 128 controlled from a central location such as the locomotive and operated by the engineer or other member of the train crew. Control of solenoid 120 may be initiated by a radio or infrared signal generated by a transmitter 130 which may be controlled by the engineer from the locomotive or may be of the portable type operated by another member of the train crew. The radio control eliminates the necessity to apply wires to the railway train and makes it possible to convert single cars to this system of hand brake release. As another manner of controlling the operation of solenoid 120, a trackside signal of the active or inert type may be used. The active type would generate a radio signal when a train was passing which would be received by the electronic control system 126 and cause the release of the hand brakes. The inert type could be a resonant coil, not shown, located at trackside which would cooperate with circuitry in the electronic control 126 to produce a resonant condition in such circuitry and cause the application of electrical power to solenoid 120 to effect release of the hand brake. Alternatively, as shown in FIG. 12, the solenoid 120 may be replaced by an electrically operated valve 121 and the lever 124 operated by a connecting rod or link 123 operated by a pneumatic cylinder 125. Air pressure to operate the cylinder 125 can be supplied from the service brake air pipe 20.

It is within the scope of this invention to use a mechanical linkage or member, not shown, located at a predetermined point on the track or wayside which will contact the quick release lever of a hand brake actuator and mechanically release the hand brakes on cars passing that point.

Figure 13:
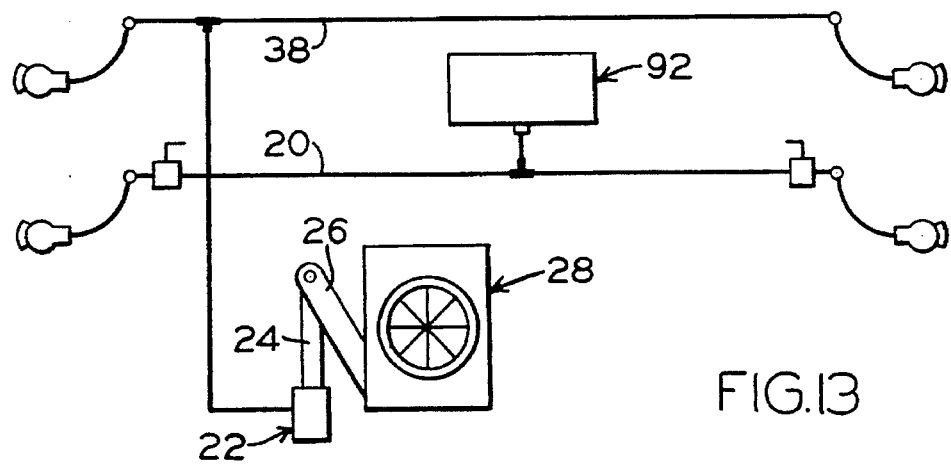
FIG. 13 depicts a hand brake release system of the invention in which operation of a release cylinder is controlled by air pressure in a hand brake air distribution system which is separate from the service brake air distribution system.

Another form of the invention, shown in FIG. 13, utilizes a separate hand brake air pressure system comprising a hand brake air pipe 38. The air pressure in pipe 38 is controlled from a central location, such as the locomotive cab, by a member of the train crew. A quick release hand brake actuator 28 has its release lever 26 connected by linkage 24 to a pneumatic release cylinder 22. When the hand brake air pipe 38 is charged with air, the release cylinder 22 will be activated, operating the quick release lever 26 and releasing the hand brakes on each car connected to the hand brake air pipe 38. An indication that all hand brakes have been released is obtained from the end of train pressure monitor, not shown, which will indicate the air pressure in the hand brake air pipe 38 at the rear of the train. When the hand brake air pipe pressure is at full charge, there is confirmation that all hand brakes have been released.

Figure 14:
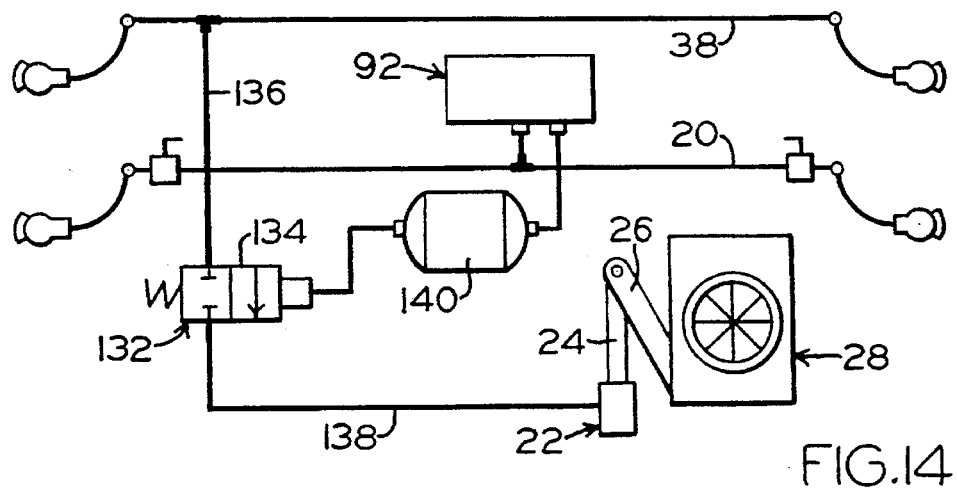
FIG. 14 shows a modified version of the form of the invention of FIG. 13.

In the form of the invention shown in FIG. 14, the hand brakes will not be released until and unless the air pressure in the service brake air pipe 20 and the auxiliary reservoir on a railway car reaches a predetermined level of charge indicating that service brakes are released and hand brakes can be released. This is accomplished by inserting a hand brake control valve 132, having a valve spool 134, into the pipe 136, 138 which carries air from the hand brake air pipe to the release cylinder 22. When air pressure in the auxiliary reservoir 140 is below the predetermined level, the spool 134 will be in the position shown in FIG. 14 and the passage through valve 132 from pipe 136 to pipe 138 and the hand brake release cylinder 22 will be closed so the hand brake cannot be released. At the predetermined level of pressure, valve spool 134 will move to the left allowing hand brake air pipe air to pass through passage 135 of valve 132 to the release cylinder 22 which will operate to release the hand brakes. Indications that the hand brake control valves on train have been operated to the release position and that the hand brake release cylinders have operated are provided by the brake pipe flow indicator, not shown, which shows air flow from an air compressor, not shown, on the locomotive to the brake pipe and by the end of train monitor previously referred to. Train personnel are thus advised that the train's hand brakes are in condition to permit movement of the train.

Figure 15:
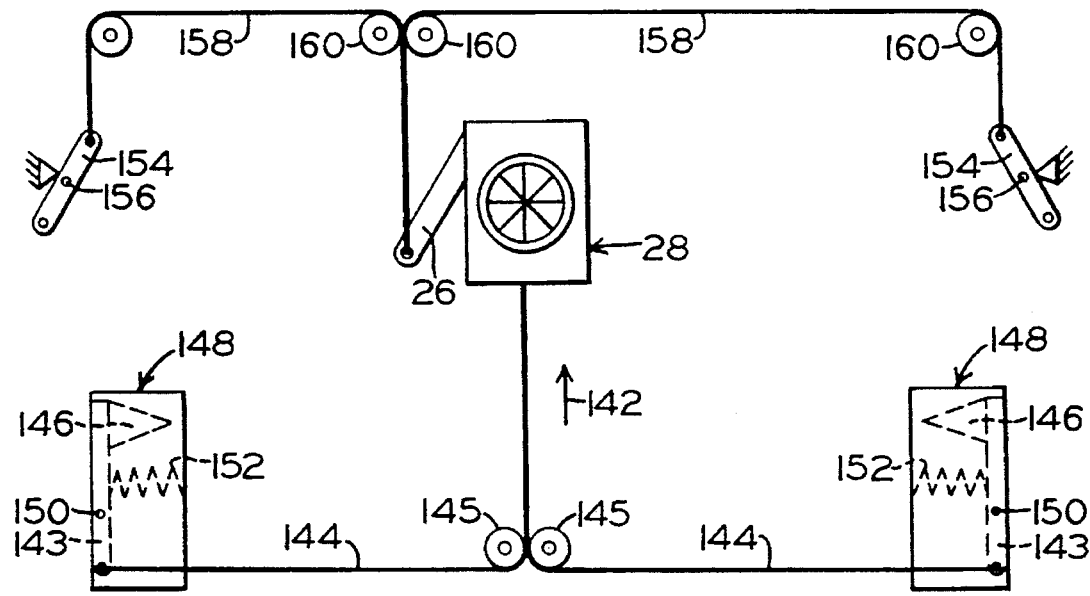
FIG. 15 pictures a form of the invention which provides a visual indication of hand brake condition.

The form of the invention shown in FIG. 15 provides a readily apparent visual indication that a hand brake is applied. When the hand brake actuator 2S is manipulated to engage the hand brakes, in addition to putting tension on a chain or cable, not shown, for engaging the brakes, a pulling force is also applied in the direction of the arrow 142 to the chains or cables 144 which are connected to levers 143 which carry flags 146 located in housings 14S on each side of a railway car. As the cables 144 move in the direction of the arrow 142, the levers and flags will rotate on pivots 150 and out of their housings to a visible position. Tension springs 152 are connected between levers 143 and a fixed point on the housings 148 to normally maintain the flags 146 in their housed positions. Pulleys or other elements shown diagrammatically at 145 may be provided as necessary. A member of the train crew can make a visual inspection of hand brake or parking brake condition of an entire train from either side of the train merely by looking down the side of the train. A visible flag 146 will indicate that a hand brake is applied on a given car and a brakeman needs merely to proceed to that car and operate the hand brake release lever. To further facilitate the release of hand brakes in this arrangement there may be added a set of remote release levers 154, one on either side of a car and pivoted by a pivot 156 to a suitable structure on the car. Each of the remote release levers 154 is connected by suitable chains, cables, pulleys and the like as necessary, indicated by the numerals 158 and 160 to the release lever 26 of the hand brake actuator 28.

Figure 16:
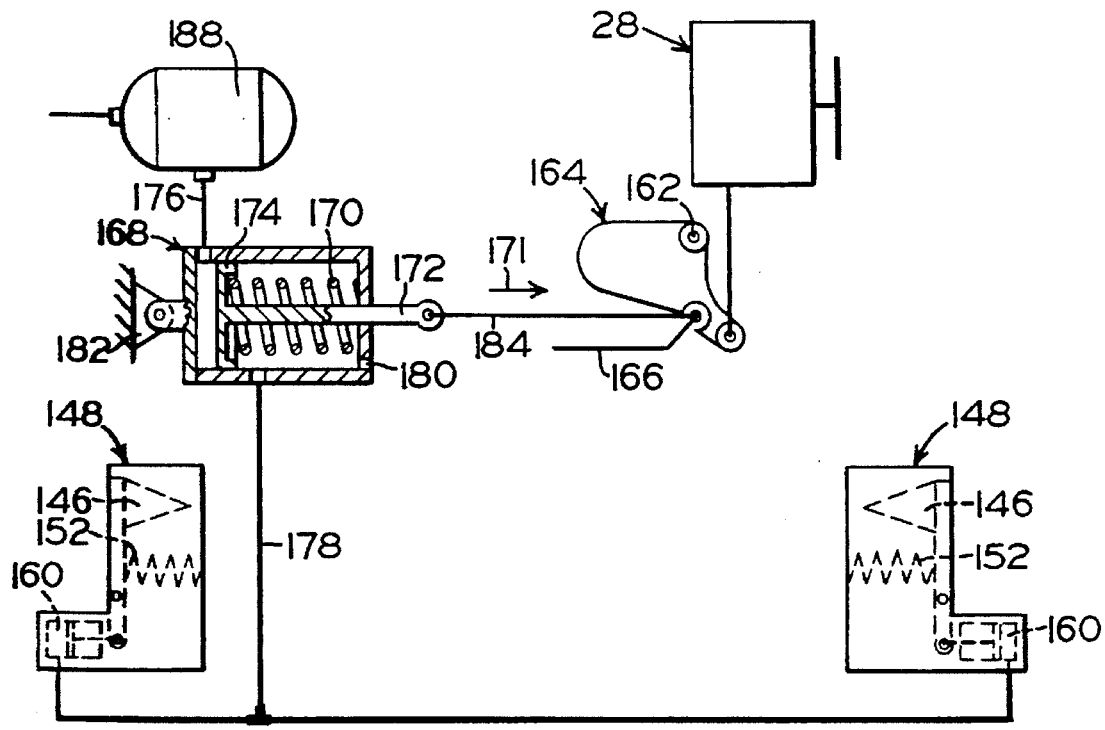
FIG. 16 shows a form of the invention in which a visual signal of hand brake condition is operated by air pressure.

FIG. 16 shows an arrangement similar to that of FIG. 15 except that the flags 146 are operated by pneumatic cylinders 160 instead of by mechanical linkage. In this version of the invention a bell crank 164, which is part of the parking brake system, is also operatively connected to a flag operation valve 168 which controls the supply of air pressure to cylinders 160. Piston 174 of valve 168 is normally-held by a spring 170 in the position shown in FIG. 16 in which it prevents the flow of air from the service air brake system through pipe 178 to flag operation cylinders 160 and in which pipe 178 is connected to exhaust port 180. When hand brake actuator 28 is operated to apply the brakes, bell crank 164 will pivot about pivot 162 pulling on chain or cable 166 to apply the hand brakes. In addition, a pull in the direction of arrow 171 will be exerted on chain or cable 184 which is connected by linkage or pulleys as necessary to the piston rod 172 of flag operation valve 168 moving piston 174 to the right against the bias of spring 170 and providing a connection between pipe 176 connected to a source of air pressure, for example the service air brake air pipe or the air reservoir 188 of the service air brake system, and pipe 178 connected to the cylinders 160. Cylinders 160 operate to pivot flags 146 out of their housings 148. When the hand brakes are released, spring 170 returns the piston 174 of flag operation valve 168 to its position shown in FIG. 16 connecting pipe 178 to exhaust port 180. The pressure in pneumatic cylinders 160 will exhaust and flags 146 will be returned into their housings 148 by springs 152. Flag operation valve 168 is secured to a stationary point on a railway car by suitable means 182 which may be a bracket or pivot.

Figure 17:
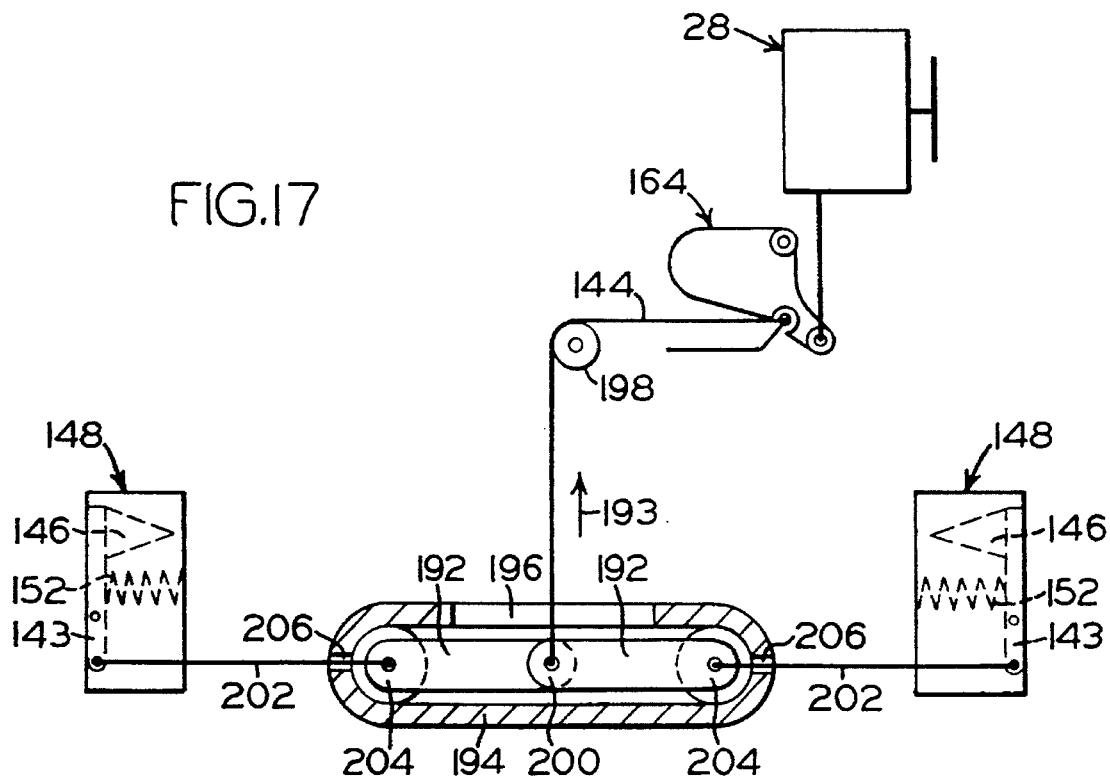
FIG. 17 illustrates another form of the invention which provides a visual signal indication of hand brake condition.

FIG. 17 illustrates a form of the invention similar to that in FIG. 15 but illustrating another type of linkage between the cable or chain 144 and the flag lever 143. Cable or chain 144 is shown as passing over pulleys or guides, illustrated as a pulley 198, to a pivot 200 connecting a pair of links 192 of equal length slidably disposed within an elongated housing 194. Housing 194 has an elongated opening 196 and a pair of opposed openings 206, one at each end. Additional cables or chains 202 each have one end passing through one of the openings 206 and attached to one end 204 of the links 192 and their respective other end attached to one of the flag levers 143. When the hand brake is applied, cable 144 will pull upward on pivot 200 in the direction of arrow 193 causing links 192 to be pulled through elongated opening 196 in housing 194. This will also cause the ends 204 of links 192 to move inward toward each other pulling cables 202 through the openings 206 and pivoting flag levers 143 out of their housings. Rollers 190 may be provided at the ends 204 of the links 192 for smoother operation of the linkage. Upon release of the hand brakes, tension on cable 144 will be relaxed and springs 152 will pull the flag levers 143 and links 192 back into the position shown in the drawing.

Figure 19:
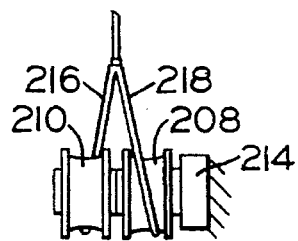
FIG. 19 is a side elevation view of a pulley which can be used in the form of the invention shown in FIG. 15.
Figure 18:
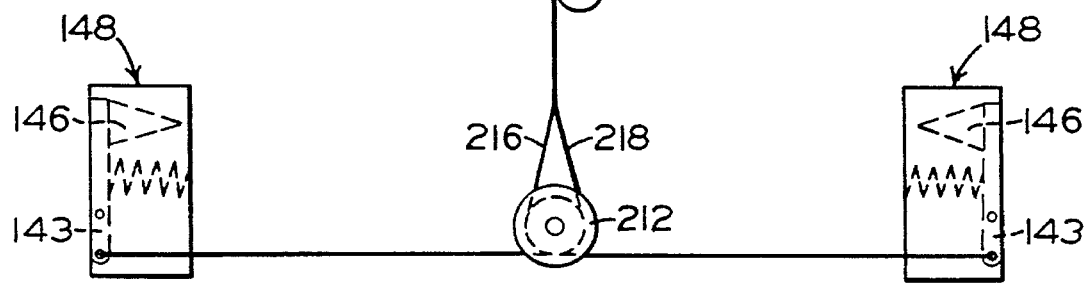
FIG. 18 illustrates another version of the form of the invention shown in FIG. 15.

FIGS. 18 and 19 illustrate another specific form of mechanism which can be used in the connection between the bell crank or lever 164 and the flag operating levers 143. As best seen in FIG. 19, a pair of chain or rope drums 208 and 210 are rotatably mounted on an axle or spindle 212 which is rigidly secured to a suitable mounting 214 on a railway car. A single chain or cable 144 connected to the bell crank or lever 164 is connected to two chains or cables 216 and 218 which are wrapped over the drums 210 and 208 respectively in opposite directions and attached to one of the levers 143 of the indicator flags 146.

Figure 20:
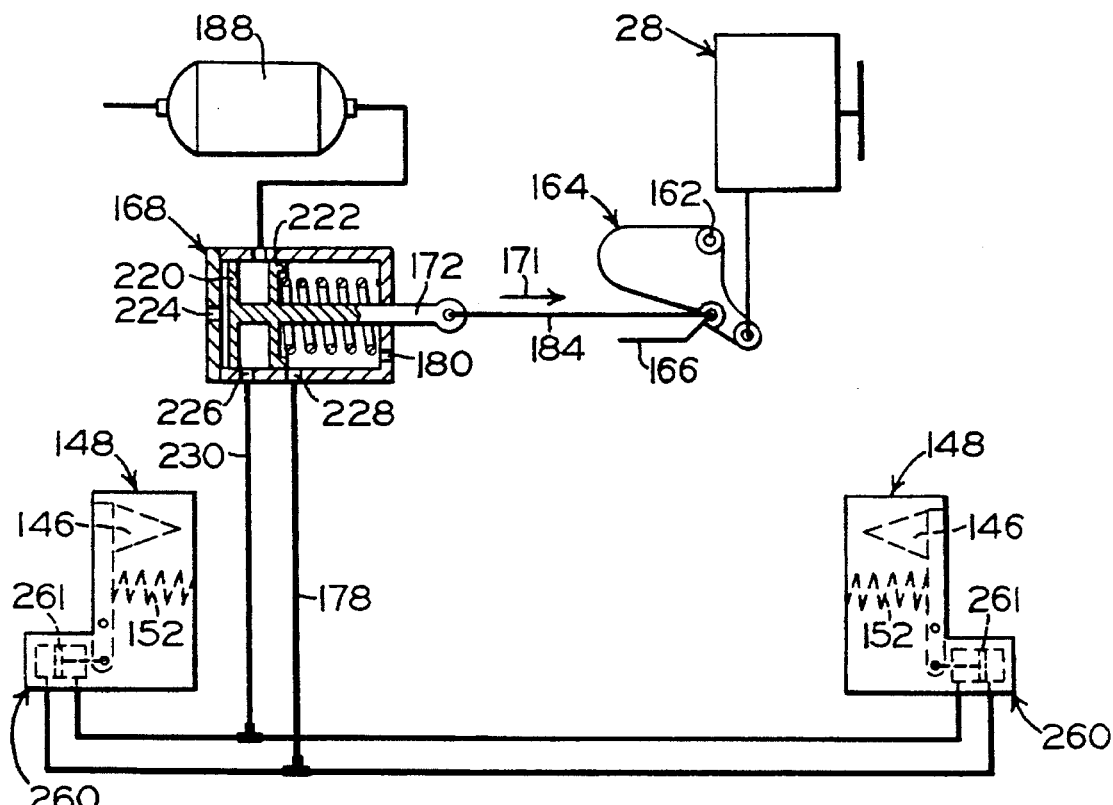
FIG. 20 shows a modification of the invention as pictured in FIG. 16 using double acting cylinders to operate visual signals.
Figure 21:
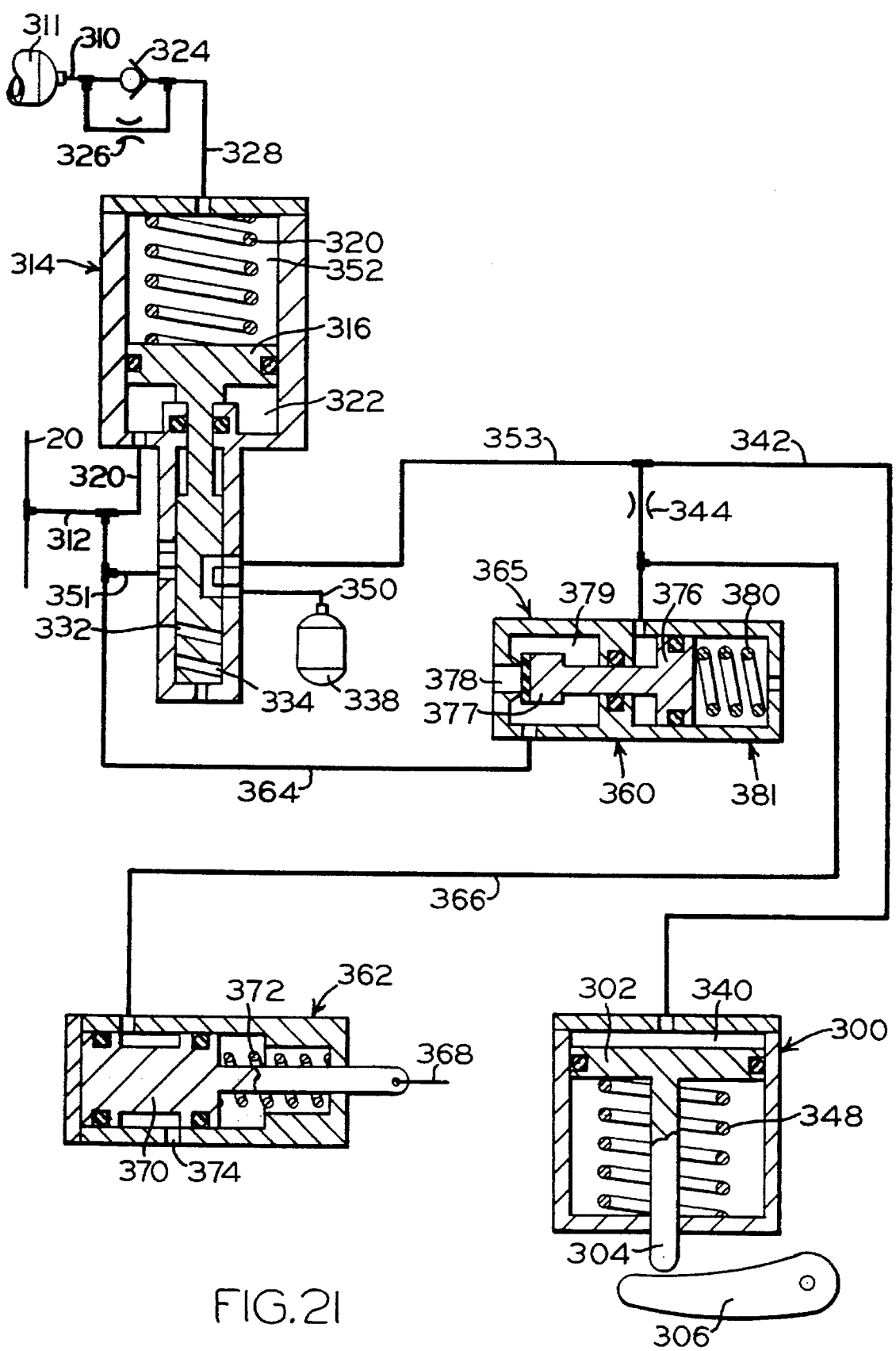
FIGS. 21 through 24 comprise a schematic representation of a form of the invention, which includes a release ensuring feature, in various stages of operation.

FIG. 20 illustrates a form of the invention similar to that described in connection with FIG. 16 using double-acting pneumatic cylinders 260 so that retraction and retention of the flags 146 into their housings is under positive power from the cylinders 260 rather than solely under the influence of springs 152. In this form of the invention flag operation valve 168 has a double headed piston with piston heads 220 and 222, exhaust ports 180 and 224 and outlet ports 226 and 228 which are connected to pipes 230 and 178, respectively.

Pipe 178 is connected to one side of piston 261 and pipe 230 is connected to the opposite sides of pistons 261 of cylinders 260. With the hand brakes released as shown in FIG. 20 spring 170 will hold the piston heads 220 and 222 to the left as viewed in FIG. 20 so that pipe 178 is connected to exhaust through ports 228 and 180 while pipe 230 is connected through port 226 to the pressure in service air brake reservoir 188. This will hold the pistons 261 pneumatic cylinders 260 in the position shown in FIG. 20, holding flags 146 in their housings. When the hand brakes are applied, tension on chain or cable 184 will force the piston heads 220 and 222 to the right against the pressure of spring 170 connecting port 226 and pipe 230 to exhaust through port 224 and connecting pipe 178 through port 228 to air pressure in railway car brake cylinder reservoir 188. This in turn will cause the pistons 261 in pneumatic cylinders 260 to move in a direction which will pivot the flags 146 out of their housings indicating a hand brake applied condition. When the hand brakes are released, the compression spring 170 will return the pistons 220 and 222 of valve 168 to the condition shown in FIG. 20, operating the pistons 261 of cylinders 260 in a direction which will cause the flags 146 to be retracted into their housings.

Figure 25:
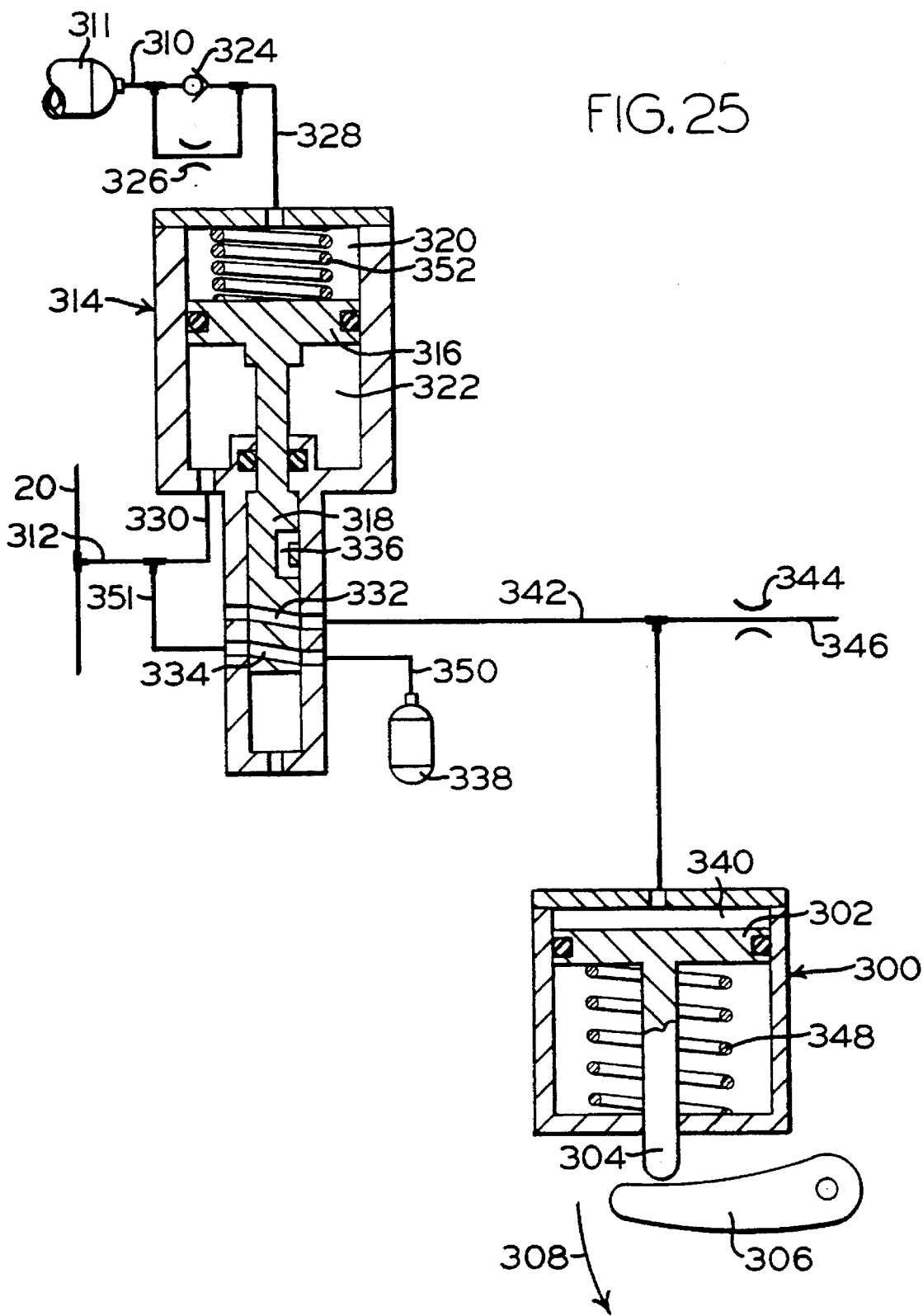
FIG. 25 is a schematic representation of a simplified version of the form of the invention shown in FIGS. 21 through 24.

Turning now to FIG. 25 there is shown a hand brake release system which comprises a spring biased pneumatic cylinder 300 having a piston 302, bias spring 348 and piston rod or plunger 304 which contacts a quick release lever 306 of a hand brake actuator, not shown. Pivoting of lever 306 in the direction of arrow 308 will effect the release of the hand brake. The system also includes a hand brake release valve 314 having a piston 316 which is connected to and controls a reciprocating valve 318. The valve 314 further has a first chamber 320 connected via a pipe 328, through a check valve 324 and a choke valve 326 in parallel and through a connection 310 to the auxiliary reservoir 311 of the service air brake system. Valve 314 also has a second chamber 322 connected via pipe 330 through an outlet 312 to the service air brake air pipe 20. Slide valve 318 has a first passage 332 which is connected to atmosphere or exhaust, a second passage 334 and a third passage 336. A pipe 342 connects cylinder 300 to slide valve 318 and to exhaust at outlet 346 through a choke valve 344. As shown in FIG. 25, the hand brakes are on and the air brake system including the air pipe 20 and auxiliary reservoir 311 are being charged to the predetermined level and the service brakes are off after a full service or emergency application. At this time chamber 340 of pneumatic cylinder 300 is connected to atmosphere through pipe 342 and passage 332 of valve 318 and through choke valve 344 and outlet port 346. Therefore, piston 302 is maintained in the position shown by a compression spring 348. The system further includes pressure bulb 338 which is connected via pipe 350, passage 334, pipe 351 and outlet 312 to the service air brake air pipe 20. For an initial period of time during the air brake system charge cycle, air pressure in chamber 322 and pressure bulb 338 will exceed the pressure in chamber 320 of release valve 314 because the flow of air into chamber 320 is restricted by choke valve 326. Spring 352 will be compressed and the positions of piston 316 and the body of valve 318 will remain as seen in FIG. 25. However, in time, sufficient air will pass through choke valve 326 to raise the pressure in chamber 320 to a point where it will substantially equal the pressure in chamber 322 resulting in piston 316 moving downward as viewed in FIG. 25 under the influence of spring 352 connecting pipe 350 to pipe 342 through passage 336. This will cause air in pressure bulb 338 to flow quickly into chamber 340 of cylinder 300, pivoting quick release lever 306 in the direction of arrow 308 and releasing the hand brakes. Bulb 338 and chamber 340 will also be connected to exhaust through choke valve 344 and outlet 346 and the pressure in them will eventually dissipate allowing spring 348 to push piston 302 back to the position shown in FIG. 25. The hand brakes can now be manually operated. The system will remain in this condition with piston 316 of release valve 314 in its downward position and piston 302 of cylinder 300 in its upward position until there is another full service or emergency application of the service air brakes when the release valve will go through another cycle. A full service or emergency application of service air brakes will cause both the brake pipe 20 and the auxiliary reservoir 311 pressure to be reduced. When the service brakes are released the service air brake system will begin to recharge with air. As previously described, the pressure in chamber 322 will rise faster than the pressure in chamber 320 so that piston 316 will be forced into its position illustrated in FIG. 25 and will go through a release operation cycle as described. This correlates to the air brake test procedure earlier described and ensures that hand brakes or parking brakes will be released automatically whenever an air brake test is performed prior to a train leaving a yard or terminal.

Figure 22:
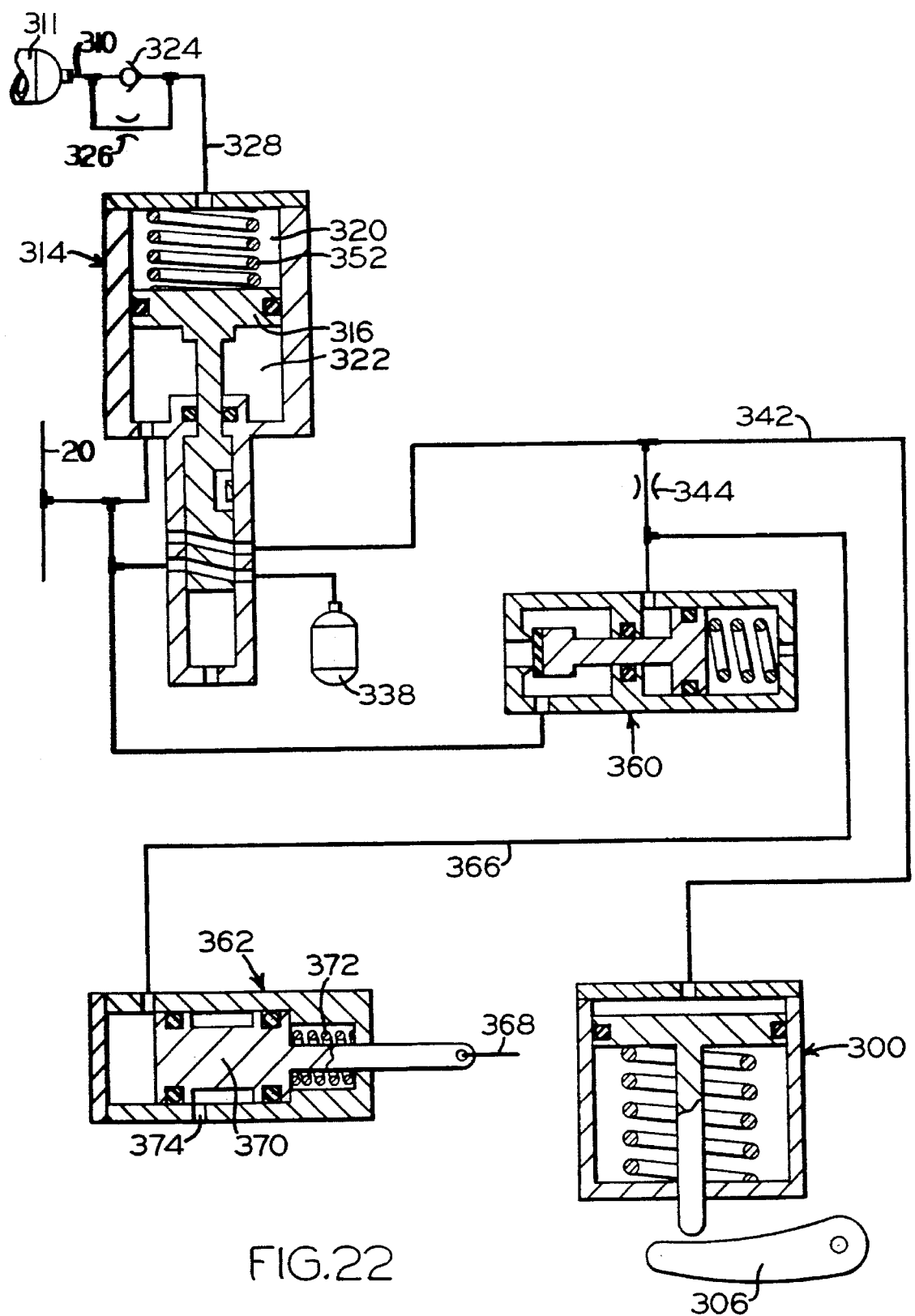
Figure 23:
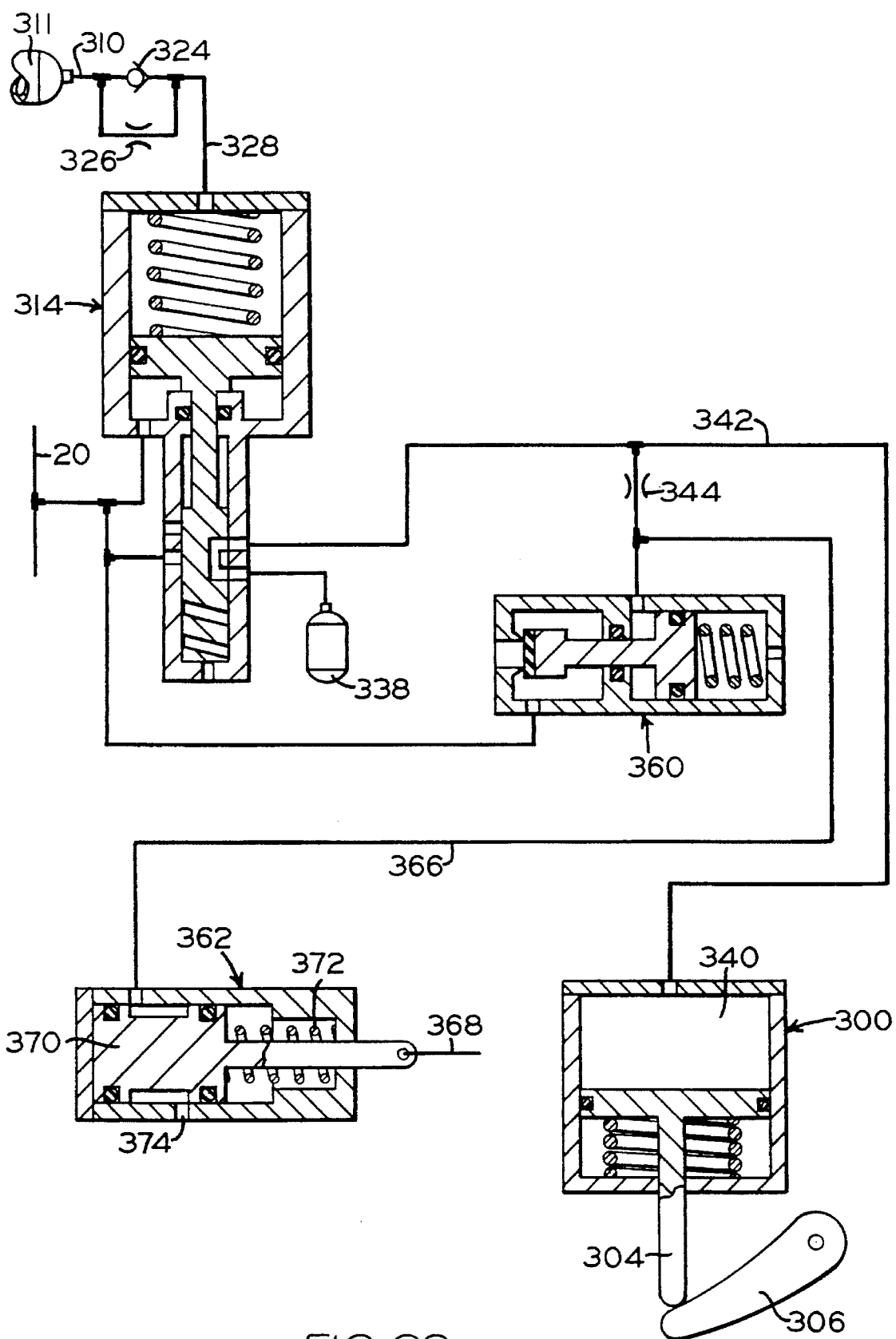
Figure 24:
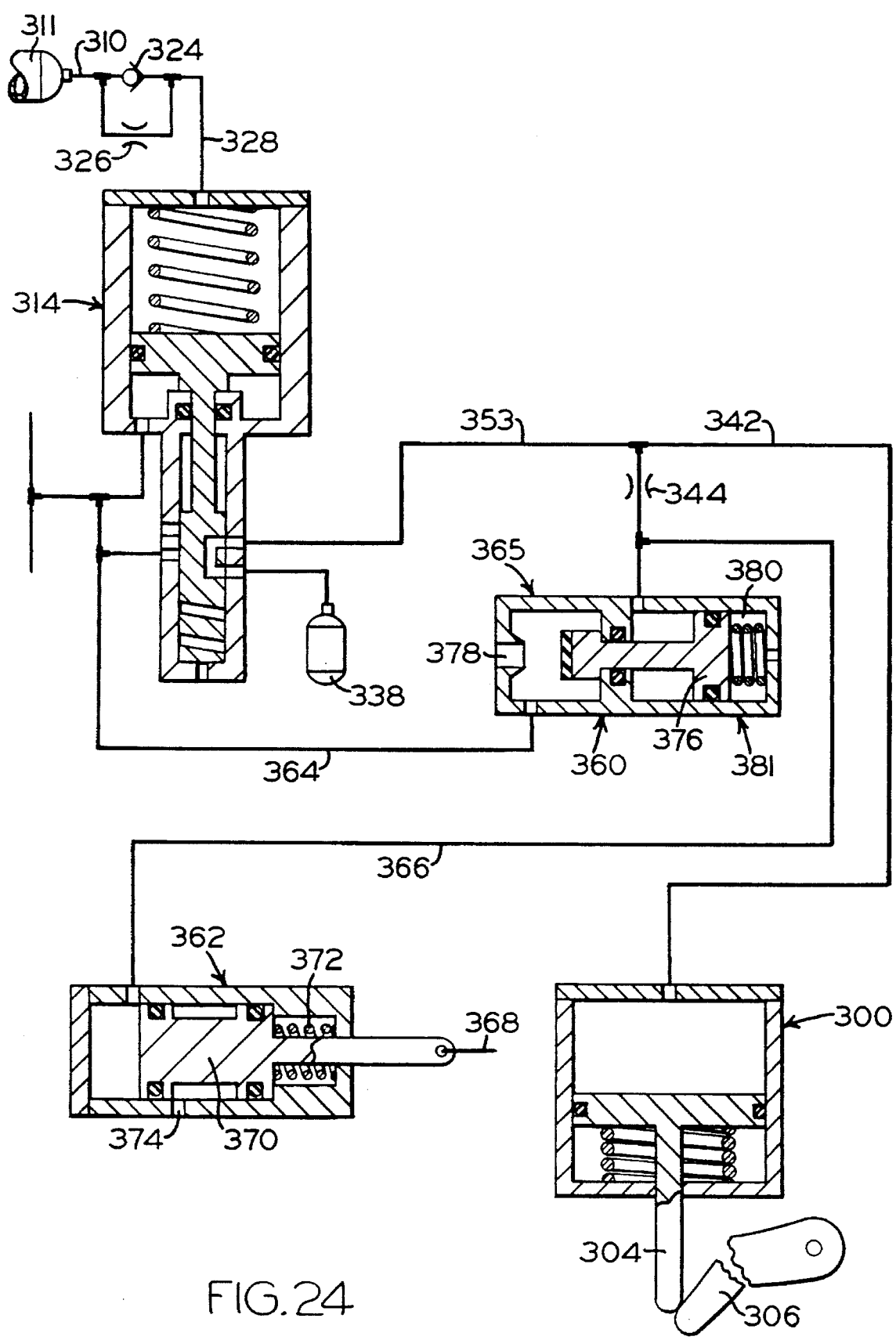

FIGS. 21 through 24 show a modification of the system shown in FIG. 25 which modification includes a release ensuring feature. In addition to the elements described in connection with FIG. 25, this system also includes a release ensuring valve 362 and a brake pressure exhaust valve 360. Release ensuring valve 362 is connected by a pipe 366 to the exhaust side of choke valve 344. It has a valve body 370, a spring 372 which biases the valve body 370 toward the left as viewed in FIG. 21 and an exhaust port 374. In this position of valve body 370 pipe 366 is connected to atmosphere through exhaust port 374. Valve body 370 is connected by a chain or cable 368 to the hand brake mechanism in such a manner that application of the hand brakes will cause valve body 370 to move to the right and communication between pipe 366 and exhaust port 374 will be cut off as can be seen in FIG. 22.

Brake pressure exhaust valve 360 has a piston portion 381 in which there is a piston head 376, an exhaust portion 365 which has a chamber 379 having an exhaust port 378 and a valve head 377 connected to the piston head 376 and reciprocable within chamber 379 to control the opening and closing of exhaust port 378. A pipe 364 connects outlet 312 to chamber 379.

As was previously described, after either a full service or emergency application of the service air brakes, air will be supplied to charge the brake pipe and the auxiliary reservoir, the pressure in chamber 322 will rise as the pressure rises in brake pipe 20 while the pressure in chamber 320 will rise more slowly due to the choke valve 326 interposed between the auxiliary reservoir,and the chamber 320. This will cause piston 316 to move upward against the pressure of spring 352 and assume the position shown in FIG. 22. Eventually the pressure in chamber 320 will approximate the pressure in chamber 322 and piston 316 will move downward under the influence of spring 352 to the position shown in FIG. 23. When this occurs, pressure bulb 338 will send compressed air into chamber 340 of hand brake release cylinder 300 tripping quick release lever 306 and releasing the hand brakes. Release of the hand brakes will also relieve tension from chain or cable 368 permitting valve body 370 to be moved by spring 372 to the left to its original position exhausting air from chamber 340 of release cylinder 300 and from pressure bulb 338 through pipes 342 and 366 and pipes 350 and 353 respectively. In the event that the hand brakes are not released for any reason such as, for example, the fracture of release lever 306, and the hand brakes remain applied, tension from chain or cable 368 will remain, holding valve body 370 to the right in the position shown in FIG. 24. This will prevent the escape of air in release cylinder 300 and pressure bulb 338 to atmosphere and the pressure in those areas will pass through choke valve 344 into the piston portion 381 and cause the piston 376 of brake pressure exhaust valve 360 to move to the right compressing spring 380 and opening exhaust port 378. When this occurs pipe 364 will connect the brake pipe 20 to atmosphere causing application of the service brakes so that the train cannot be moved. This ensures that unless all hand brakes are released the train cannot be moved.

As will be understood by those skilled in the art, all or portions of the apparatus disclosed in connection with the hand brake or parking brake release system may be enclosed in a single package or unit whereby its installation would require only the necessity of making external pipe connections from the service air brake air pipe and from the auxiliary reservoir.

Figure 26:
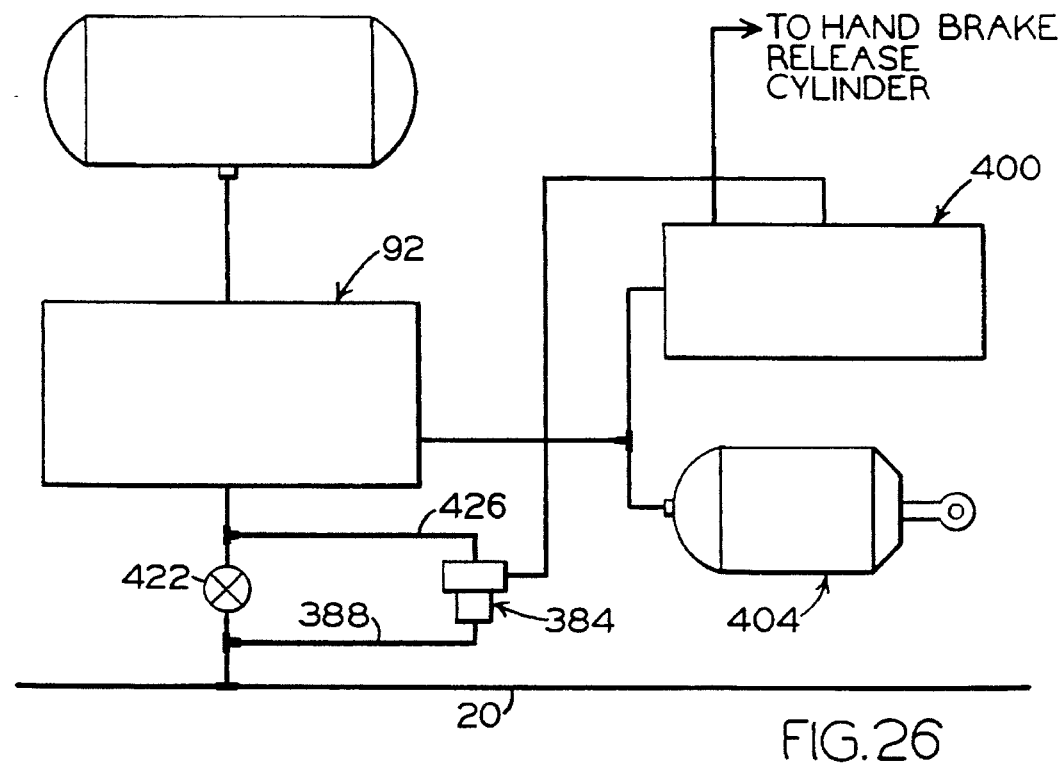
FIG. 26 is a schematic block diagram of the parts and piping for an automatic form of the invention.
Figure 28:
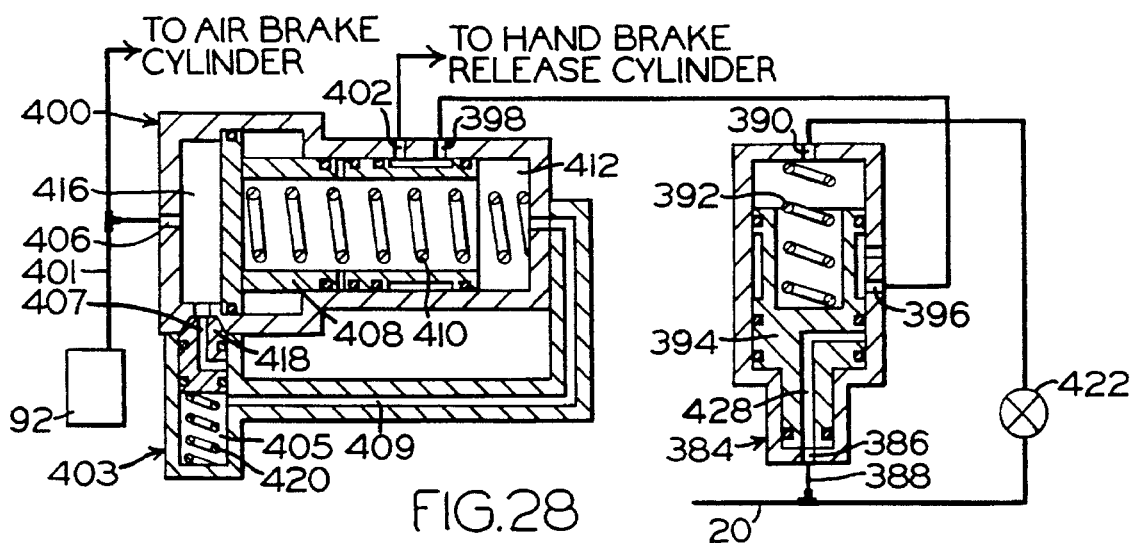
FIG. 28 is a view similar to FIG. 27 but with the service air brake system connected and the air brakes not applied.
Figure 29:
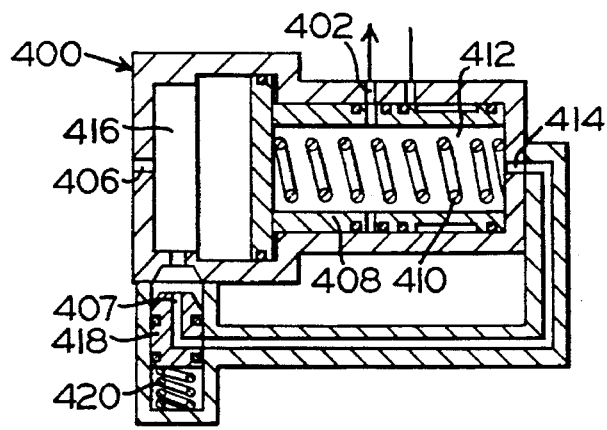
FIG. 29 is a schematic view of the hand brake release valve of FIG. 27 with the service air brakes applied.

FIG. 26 is a block diagram of a hand brake release system of the invention which will operate automatically as long as it is connected to the service air brake air pipe 20 even if the service air brakes on a particular railway car are shut off. It comprises a hand brake release valve 400 which controls the supply of air to a hand brake release cylinder, not shown. The hand brake release valve 400 is itself controlled by a T valve 384 connected to the service brake air pipe 20 in parallel with an air brake shut off valve on cut-out out cock 422. The hand brake release valve 400 is also connected to the service air brake brake cylinder 404 and the railway car air brake control valve 92. Valve 400 has a main valve slide 408 which is biased by spring 410 toward the position shown in FIG. 28. Normal operation of the system will be described in connection with FIG. 28, normal operation being considered the conditions prevailing when the service air brake shut off valve 422 is open or on and the service brakes not applied. As can be seen in FIG. 28, inlet port 386 of T valve 384 is connected to air pressure in air brake pipe 20 by pipe 388. In the normal position described air pipe air pressure is applied to port 386 and also to port 390 of T valve 384. Therefore, spring 392 holds the valve body 394 in the position shown in FIG. 28 connecting port 396 to exhaust. This connects port 402 of hand brake release valve 400 through ports 398 and 396 to exhaust so that the hand brake release cylinder, not shown, does not operate. The hand brakes can be applied manually and will remain on until released as described below. Release valve 400 also includes an equalizing portion 403 which has a chamber 405 in which a slide 418 is mounted for reciprocating movement. In one position of slide 418 as seen in FIG. 28, in which valve slide 418 is normally held by a spring 420, a passage 407 in the valve slide is out of registry with passage 409 which is connected to exhaust through chamber 405. In another position of slide 418 passages 407 and 409 are in registry and chamber 416 is connected to chamber 412 of release valve 400. When air brakes are applied, pressure in pipe 401 and chamber 416 of release valve 400 will rise and hand brake release valve 400 will assume the position shown in FIG. 29. Air pressure from service air brake brake cylinder 404 in FIG. 26 is applied to port 406 of hand brake release valve 400 raising the pressure in chamber 416 which moves slide 418 downward as viewed in FIG. 29 compressing spring 420, lining up passages 407 and 409 and connecting chamber 416 with chamber 412. Pressure in chamber 416 also causes slide 408 to move to the right compressing spring 410 and connecting pressure in chamber 412 through port 402 to the hand brake release cylinder, not shown, to release the hand brakes. In time the pressure in chambers 416 and 412 equalizes and spring 410 causes slide 408 to move back to the position shown in FIG. 28, connecting the hand brake release cylinder to exhaust. The hand brakes can again be applied if desired.

Figure 27:
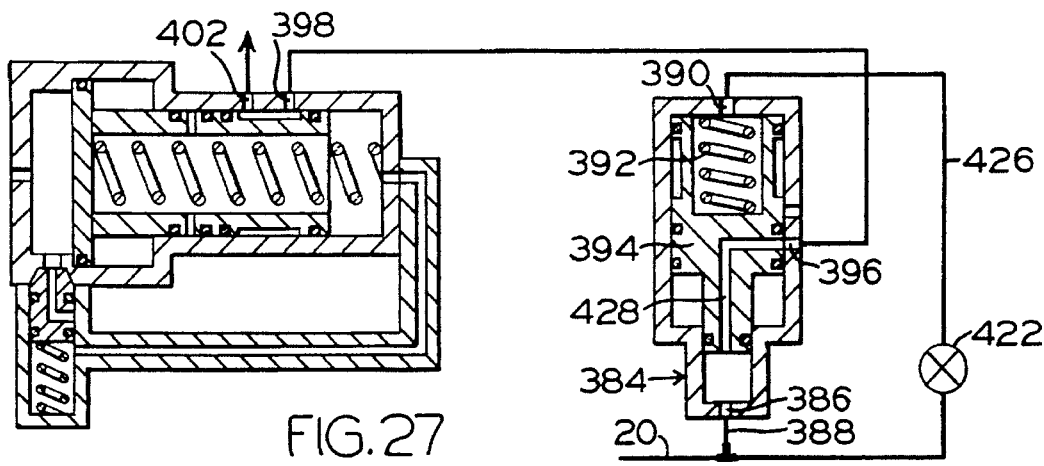
FIG. 27 is a schematic illustration of a hand brake release valve of FIG. 26 and its associated T-valve with the service air brake system shut off.
Figure 30:
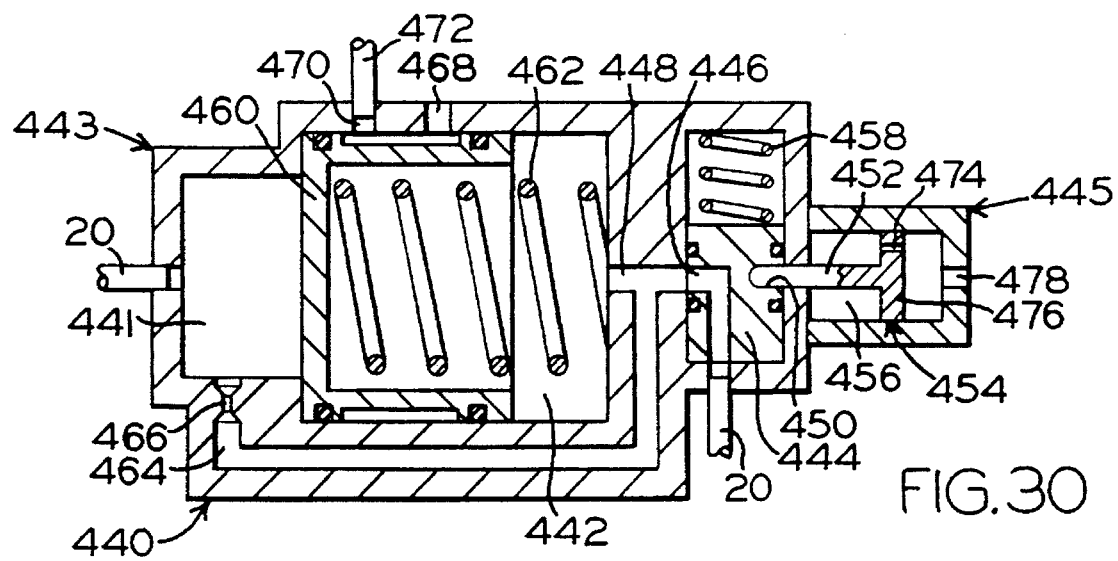
FIGS. 30 through 32 are schematic views of a valve used in a form of the invention which operates automatically to release hand brakes when an air brake terminal test is performed showing the valve in various stages of operation.
Figure 31:
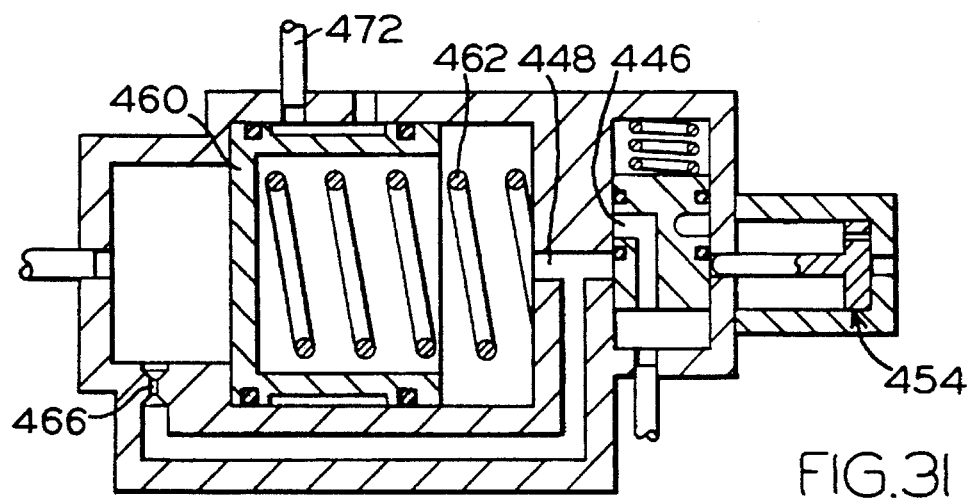
Figure 32:
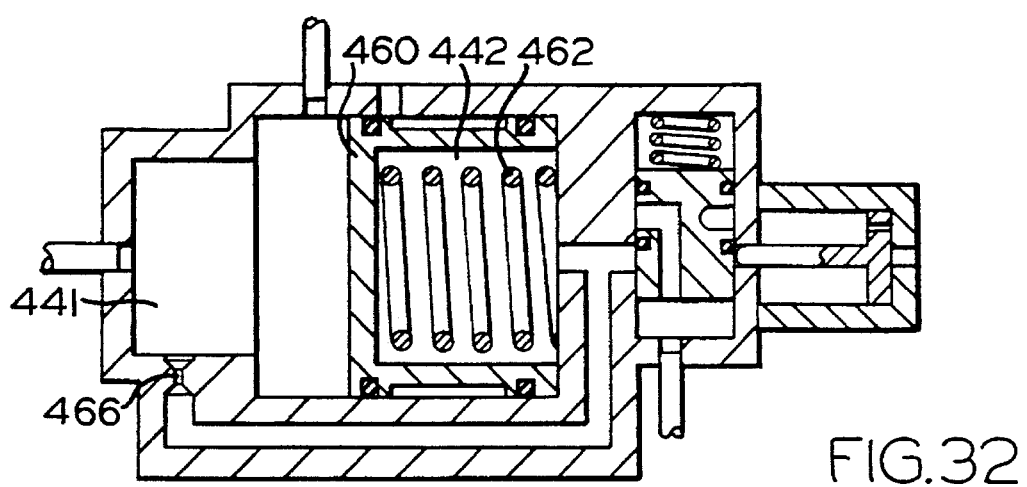

FIG. 27 shows the system of FIG. 26 with the air brake system shut off by means of shut off valve or cut-out cock 422. As will be seen from FIG. 27, when shut off valve 422 is closed, air pressure will be applied to the lower end of T valve 384 through port 386 but there will be no air pressure through pipe 426 and port 390 to the top of valve slide 394. Spring 392 will remain compressed and air pressure will be supplied through passage 428 and port 396 of T valve 384 to ports 398 and 402 of hand brake release valve 400 with slide 408 in the position shown. The release cylinder will operate, releasing the hand brake and the hand brake cannot be operated until air in the service air brake pipe 20 is exhausted. When this occurs there will be no pressure at inlet port 386 of the T valve, spring 392 will force valve slide 394 down and into exhaust position seen in FIG. 28, releasing pressure from the hand brake release cylinder and allowing the hand brake to be operated. FIG. 30–32 illustrates a hand brake release system designed to release hand brakes or parking brakes automatically upon completion of an air brake test when a train is preparing to leave a yard or a terminal.

As seen in FIG. 30, there is provided a hand brake release valve 440 having a release portion 443 and a valve stop portion 445. Release portion 443 has a first chamber 441 and a second chamber 442. Chamber 441 is connected to the air brake air pipe 20 of the service air brake system on the train and chamber 442 is also connected to such air pipe through a valve slide 444. When valve slide 444 is in the position shown in FIG. 30, passage 446 in the valve slide will be in registry with passage 448 and provide a connection from chamber 442 to the service air brake pipe 20. Valve slide 444 is provided with a slot or detent 450 which is engageable by the stem 452 of a valve stop piston 454 mounted for reciprocal movement in a chamber 456 in the valve stop portion 445. Valve slide 444 is normally urged toward its lowermost position as shown in FIG. 30 by spring 458. A valve slide 460 is mounted for reciprocating movement in chamber 442 and is normally urged toward the left of valve chamber 442 by spring 462 as viewed in FIG. 30. Passage 464 connects passage 448 and consequently valve chamber 442 to valve chamber 441 through a restriction or choke 466. Port 468 is an exhaust port open to atmosphere and outlet port 470 is connected by a pipe 472 to a hand brake release cylinder (not shown). Valve stop portion 445 has a port 478 which is connected to the service brake air pipe. A restricted opening or choke 474 is provided through the piston 476 of valve stop piston 454. Operation of the hand brake release system shown in FIG. 30 is as follows. When there is no pressure in the system, as when a train is first made up, the valve slides 444 and 460 will be in the position shown in FIG. 30 and valve stop piston 454 will be free to move in valve slide chamber 456 and may assume a position toward the right end of valve slide chamber 456 with its stem 452 cut of engagement with the slot in valve slide 444. With the first charging of the service air brake air pipe 20 pressure applied to valve stop piston 454 through port 478 will cause the valve stop to move to the left causing its stem 452 to be engaged in the detent 450 of valve slide 444. This will prevent movement of valve slide 444. Both the first chamber 441 and the second chamber 442 will remain connected to the service air brake air pipe and the hand brake release cylinder will remain connected to exhaust through ports 468 and 470. When the first brake application is made in the course of an air brake test, pressure on the right side of the valve stop 454 is reduced while pressure on the left side remains initially higher since air from chamber 456 can only be exhausted through choke 474. This causes valve stop 454 to move to the right freeing valve slide 444 which is moved upward as shown in FIG. 31 compressing spring 458 as pressure in the service air brake air pipe continues to rise. This moves passage 446 out of registry with passage 448. Valve slide 460 remains to the left, as viewed in FIG. 31, under the influence of spring 462. When the service air brake system is charged, spring 460 will initially remain in the position shown under the influence of spring 462 since air pressure on both sides of valve slide 460 is the same.

When a full service brake application is made in the course of an air brake terminal test pressure in chamber 441 is also reduced but prior to a reduction in the pressure in chamber 442 by virtue of the presence of choke 466. Slide 460 remains in the position shown in FIG. 31 under the influence of spring 462. After the air brakes are released, following the full application of air brakes in the course of the air brake test, pressure in the air brake air pipe will rise as the system is charged. Pressure will rise first in chamber 441 since air fed into the chamber 442 must pass through the restriction imposed by choke 466. Therefore, slide 460 will move to the right compressing spring 462 as shown in FIG. 32. Pipe 472 which connects the hand brake release cylinder to chamber 441 will be provided with compressed air and will effect release of the hand brakes. In due course air pressure in chamber 442 will equalize with air pressure in chamber 441 as air is admitted through choke 466 to chamber 442 and spring 462 will return valve spring 460 to the position in which it is shown in FIG. 31. The hand brake release cylinder will again be connected to exhaust and the hand brakes may be manually operated.

Figures 33, 34, 35:
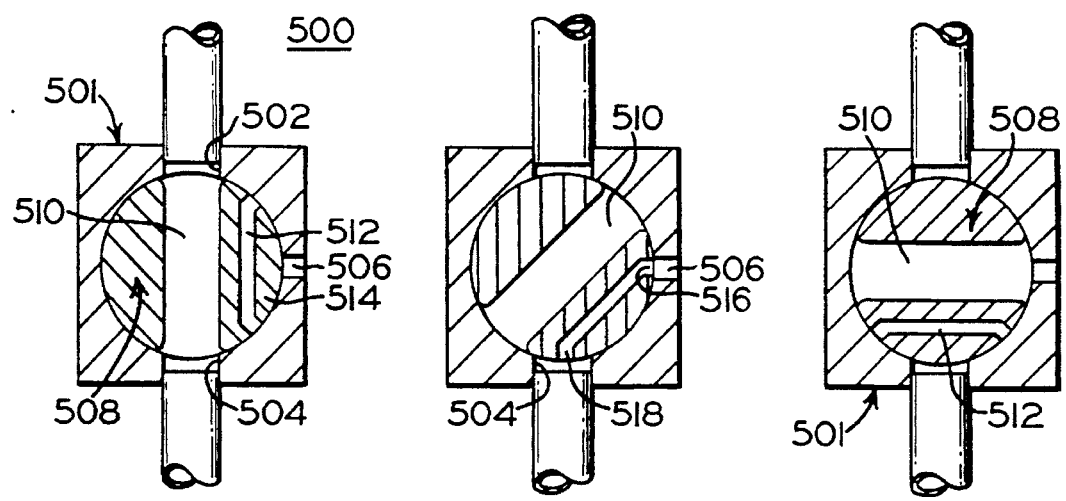
FIG. 33 is a schematic view of the control valve used in the form of the invention in FIG. 26 with the control valve shown in its open or normal position.
FIG. 34 is a schematic view of the control valve of FIG. 33 with the control valve shown in its exhaust position.
FIG. 35 is a schematic view of the control valve of FIG. 33 with the control valve shown in its closed position.

FIGS. 33, 34 and 35 illustrate a hand brake release control valve which can be used in conjunction with a hand brake release system to selectively determine whether or not the automatic hand brake release will operate. The valve 500 may be a ball valve with a body 501 having an inlet port 502, an outlet port 504, an exhaust port 506 and a ball 508 mounted for rotation within body 501. The ball 508 has a primary or first passage 510 of a predetermined diameter extending through the center of the ball and a secondary or second passage 512 extending through a segment 514 of the ball lying on one side of a longitudinal centerline of the first passage 510. Second passage 512 is of smaller diameter than the diameter of the primary passage. Inlet port 502 is in axial alignment with outlet port 504 and has substantially the same diameter as port 504 and passage 510 so that when the valve is in its open or normal position as shown in FIG. 33, passage 510, inlet port 502 and outlet port 504 form a continuous substantially unobstructed passage of a predetermined diameter through the valve body 501. Inlet port 502 is connected to the air brake air pipe 20 and outlet port 504 is connected to the hand brake release system of the invention. Exhaust port 506 is located 90° from each of the inlet and outlet ports and passage 512 is angled at its ends 516 and 518 so that when ball 508 is in the position shown in FIG. 34 outlet port 504 will be connected to exhaust port 506 through passage 512.

FIG. 34 shows the control valve in its exhaust position in which all air in the hand brake release system is exhausted to atmosphere. When released, the control valve will automatically return under spring pressure to the open or normal position making the release system again operative.

FIG. 35 shows the valve in its closed position. In this position the hand brake release valve is cut off from air pressure in the service air brake air pipe 20 and the automatic hand brake release will be inoperative until the control valve is manually returned to the open position.

Although certain preferred embodiments of the invention have been shown and described, it should be understood that many changes and modifications may be made therein without departing from the spirit and scope of the appended claims.

We claim:

1. A railway parking brake system for a railway train having at least one car equipped with fluid pressure operated service brakes, operated from a source of fluid pressure for application of said service brakes, said parking brake system comprising:

a) at least one brake contact element movable between a brake applied position and a brake released position;

b) mechanical means for biasing and maintaining said brake contact element to said brake applied position;

c) brake release means responsive to an adequate fluid pressure within said source of fluid pressure for counteracting said mechanical means and moving said brake contact element to said brake released position, such that as long as said adequate fluid pressure is maintained within said source of fluid pressure, said mechanical means will not be able to bias said brake contact element to said brake applied position; and d) a flow restricting means adapted to control a loss of fluid pressure from said brake release means in an event in which said adequate fluid pressure ceases to be maintained.

2. A railway parking brake system, according to claim 1, in which said brake contact element includes an element selected from the group consisting of a brake shoe, a clasp of a clasp brake and a pad of a disk brake.

3. A railway parking brake system, according to claim 1, in which said means responsive to an adequate fluid pressure within said source of fluid pressure is a brake cylinder.

4. A railway parking brake system, according to claim 3, in which said mechanical means is a brake pressure spring within said brake cylinder.

5. A railway parking brake system, according to claim 1, in which said flow restricting means includes a timing valve adapted to allow unrestricted fluid flow into said brake release means but limited flow therefrom.

6. A railway parking brake system, according to claim 5, in which said timing valve is disposed on a transmission line interconnecting said source of fluid pressure and said brake cylinder.

7. A railway parking brake system, according to claim 1, wherein said railway parking brake system further includes a valve means for admitting and exhausting said adequate fluid pressure from said brake cylinder as necessary to selectively release and apply a parking brake.

8. A railway parking brake system, according to claim 7, in which said valve means for admitting and exhausting said adequate fluid pressure from said brake cylinder is remotely operated.

9. A railway parking brake system, according to claim 8, in which said remote operation is electrically operated via wire.

10. A railway parking brake system, according to claim 8, in which said remote operation is electronically operated via a radio transmission.

11. A railway parking brake system, according to claim 8, in which said remote operation is electronically operated via an infrared transmission.

12. A railway parking brake system, according to claim 1, in which said brake contact element is a brake shoe incorporated within said service brakes and said means responsive to an adequate fluid pressure within said source of fluid pressure includes a brake cylinder incorporated within said service brakes.

13. A railway parking brake system, according to claim 12, wherein said railway parking brake system further includes a latching means adapted for locking said brake shoe in a brake applied position when said service brakes are applied and unlatching means responsive to said adequate fluid pressure within said source of fluid pressure for disengaging said latching means.

14. A railway parking brake system, according to claim 13, wherein said railway parking brake system further includes a throttling valve interposed between said latching means and said source of fluid pressure to slow a release of any fluid pressure from said unlatching means.

15. A railway parking brake system, according to claim 12, wherein said railway parking brake system further includes conduit means for admitting fluid pressure from said source of fluid pressure to said brake cylinder, said conduit means having a first inlet conduit including a controller valve to control fluid pressure within said first inlet conduit connected to a first side of a double check valve through which at least one of said service brakes is applied, a second conduit including a metering choke valve, connected to a second side of said double check valve, through which said parking brake is released, and a third inlet conduit interconnecting said double check valve and said brake cylinder.

* * * * *

UNITED STATES PATENT AND TRADEMARK OFFICE
CERTIFICATE OF CORRECTION

PATENT NO. : 5,558,411

DATED : September 24, 1996

INVENTOR(S) : Wajih Kanjo, et al.

It is certified that error appears in the above-identified patent and that said Letters Patent is hereby corrected as shown below:

Column 1, line 18, please delete "cut" and insert —out—;
column 1, line 29, please delete "he" and insert —be—;
column 1, line 59, please delete "ten" and insert —term—.
Column 2, line 13, please delete "cut" and insert —out—;
column 2, line 59, please delete "and";
column 2, line 59, after "apparatus", please insert —,—.
Column 3, line 51, please delete "e" and insert —the—.
Column 4, line 1, please delete "mere" and insert —more—;
column 4, line 11, please delete "in".
Column 5, line 42, please delete "Band" and insert —Hand—.
Column 6, line 28, please delete "Band" and insert —Hand—;
column 6, line 64, please delete "-".
Column 7, line 12, after "4", please insert —utilizes—;
column 7, line 35, please delete "he" and insert —be—.
Column 8, line 3, please delete "cut" and insert —out—;
column 8, line 23, please delete "thing" and insert —timing—;
column 8, line 38, please delete "-".
Column 9, line 5, please delete "3S" and insert —38—.
Column 11, line 16, after "pipe"(second occurrence), please insert —38—;
column 11, line 25, after "on", please insert —the—;
column 11, line 35, please delete "2S" and insert —28—;
column 11, line 40, please delete "14S" and insert —148—.
Column 12, line 1, please delete "-";
column 12, line 14, after "example", please insert —,—;
column 12, line 14, after "pipe", please insert —20—.
Column 13, line 8, after "261", please insert —of—.
Column 14, line 53, please delete ",".

UNITED STATES PATENT AND TRADEMARK OFFICE
CERTIFICATE OF CORRECTION

PATENT NO. : 5,558,411
DATED : September 24, 1996
INVENTOR(S) : Wajih Kanjo, et al.

It is certified that error appears in the above-identified patent and that said Letters Patent is hereby corrected as shown below:

Column 15, line 3, please delete "from" and insert ---on---;
column 15, line 30, please delete "out" (second occurrence).
Column 16, line 24, after "operated", please start new paragraph;
column 16, line 24, please delete "FIG." and insert ---FIGS.---;
column 16, line 61, please delete "cut" and insert ---out---.
Column 17, line 17, after "test", please insert ---,---;
column 17, line 30, after "course", please insert ---,---;
column 17, line 41, please delete "pert" and insert ---port---;
column 17, line 53, please delete "pert" and insert ---port---;
column 17, line 56, please delete "pert" and insert ---port---.

Signed and Sealed this

Fourteenth Day of July, 1998

*Attest:*

BRUCE LEHMAN

*Attesting Officer*   Commissioner of Patents and Trademarks